(12) United States Patent
Sakoh et al.

(10) Patent No.: US 7,882,118 B2
(45) Date of Patent: *Feb. 1, 2011

(54) CONTENT ACQUISITION METHOD

(75) Inventors: Noriyuki Sakoh, Kanagawa (JP); Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 354 days.

This patent is subject to a terminal disclaimer.

(21) Appl. No.: 10/573,580

(22) PCT Filed: Sep. 14, 2004

(86) PCT No.: PCT/JP2004/013710
§ 371 (c)(1),
(2), (4) Date: Mar. 24, 2006

(87) PCT Pub. No.: WO2005/033954
PCT Pub. Date: Apr. 14, 2005

(65) Prior Publication Data
US 2007/0088665 A1 Apr. 19, 2007

(30) Foreign Application Priority Data
Sep. 30, 2003 (JP) .............................. 2003-339136

(51) Int. Cl.
*G06F 17/30* (2006.01)
(52) U.S. Cl. ....................................... 707/758; 707/802
(58) Field of Classification Search ................. 707/758, 707/802
See application file for complete search history.

(56) References Cited

U.S. PATENT DOCUMENTS

| | | | | |
|---|---|---|---|---|
| 6,311,011 B1 * | 10/2001 | Kuroda | ......................... | 386/46 |
| 7,117,253 B2 * | 10/2006 | Nakayama et al. | .......... | 709/218 |
| 7,162,486 B2 * | 1/2007 | Patel et al. | ................... | 707/102 |
| 7,275,063 B2 * | 9/2007 | Horn | ........................... | 707/102 |
| 2002/0069218 A1 * | 6/2002 | Sull et al. | ................. | 707/501.1 |
| 2002/0077984 A1 * | 6/2002 | Ireton | .......................... | 705/51 |
| 2003/0061370 A1 * | 3/2003 | Nakayama et al. | .......... | 709/231 |
| 2003/0093790 A1 * | 5/2003 | Logan et al. | ................... | 725/38 |
| 2004/0019497 A1 * | 1/2004 | Volk et al. | ...................... | 705/1 |
| 2004/0054650 A1 * | 3/2004 | Chun | ............................. | 707/1 |
| 2004/0163033 A1 * | 8/2004 | Wolfe et al. | ................. | 715/500 |

FOREIGN PATENT DOCUMENTS

| | | |
|---|---|---|
| JP | 2002-359616 | 12/2002 |
| JP | 2003-174443 | 6/2003 |
| JP | 2003-187101 | 7/2003 |
| JP | 2004-348689 | 12/2004 |

\* cited by examiner

*Primary Examiner*—Neveen Abel Jalil
*Assistant Examiner*—Son T Hoang
(74) *Attorney, Agent, or Firm*—Oblon, Spivak, McClelland, Maier & Neustadt, L.L.P.

(57) ABSTRACT

The present invention can remarkably improve the efficiency of the acquisition process. It is determined if requested contents data are stored in a hard disk or not and, if they are not stored yet, they are acquired from a contents providing server 6 and subsequently a corresponding contents attributes file 47 is acquired from an attributes information providing server 7. If the requested contents data are already stored in the hard disk, the contents data are not requested and only the corresponding contents attributes file 47 is acquired from the attributes information providing server 7. In this way, it is possible to avoid acquiring contents data in duplicate and remarkably reduce the time necessary for the acquisition process to remarkably improve the efficiency of the acquisition process.

25 Claims, 15 Drawing Sheets

CONTENT ACQUISITION METHOD

TECHNICAL FIELD

This invention relates to a contents acquisition method that can suitably be used for acquiring contents data of a piece of music, for instance, along with information on the attributes of contents necessary for altering the attributes relating to reproduction of the contents data at a client terminal from a server by way of a network.

BACKGROUND ART

In known data delivery systems, the delivery apparatus divides the contents data to be delivered into blocks of a predetermined size and transmits the contents data to a communication terminal on a block by block basis as the block is used as unit of data. Then, the communication terminal sequentially receives the units of data transmitted from the delivery apparatus and stores the block IDs annexed to the received units of data.

If the communication between the delivery apparatus and the communication terminal is disabled and the delivery of the contents data is interrupted before all the contents data are transmitted from the delivery apparatus, the communication terminal notifies the delivery apparatus of the block IDs of the units of data it has already received when the communicable state is restored. Then, the delivery apparatus identifies the blocks that have already been delivered and the blocks that have to be delivered to the communication terminal according to the block ID notified from the communication terminal. Thus, the delivery apparatus transmits the units of data of the blocks identified as those that have to be delivered. With this arrangement, the delivery apparatus reliably can transmit the part of the contents data that the communication terminal has not received due to the interruption of delivery, minimizing duplication of transmission of units of data (see, for example, Patent Document 1).

Patent Document 1: Jpn. Pat. Appln. Laid-Open Publication No. 2002-135350 (page 1, FIG. 1, FIG. 8)

With this arrangement of a data delivery system, there arises occasions where the delivery apparatus provides the communication terminal with contents data along with information on the attributes of contents necessary for altering the attributes relating to reproduction of the contents data.

In such a case, the communication terminal cannot reproduce the contents data if it receives them until it acquires information on the attributes of the contents because it has to reproduce the contents data according to the information on the attributes of the contents. Therefore, the communication terminal receives the contents data along with the information on the attributes of the contents from the delivery apparatus in response to the request for acquiring the contents data.

Now, if the communication terminal has acquired the contents data at the time when the request for acquiring the contents data is made, it receives both the contents data and the information on the attributes of the contents in duplicate for nothing. When the communication terminal receives the contents data in duplicate, it takes a long time for the process of acquiring the contents data and the information on the attribute of the contents (to be referred to as acquisition processing time hereinafter) for nothing to reduce the efficiency of the acquisition process.

DISCLOSURE OF THE INVENTION

In view of the above-identified circumstances, it is therefore the object of the present invention to provide a contents acquisition method that can remarkably improve the efficiency of the acquisition process.

According to the present invention, the above object of the invention is achieved by providing a contents acquisition method including: a file request information transmission step of transmitting file request information that requests an acquisition/use file containing a contents providing address corresponding to a request for acquiring contents data stored in an external apparatus and an attributes information providing address, a file reception step of receiving the acquisition/use file corresponding to the file request information, a temporary storage step of temporarily storing the acquisition/use file received in the file reception step, a determination step of determining if the contents identification information corresponding to the contents providing address in the acquisition/use file is registered in a database or not, a contents request information transmission step of transmitting contents request information for requesting the contents data corresponding to the contents identification information to the external apparatus if it is determined in the determination step that the contents identification information is not registered in the database, a data reception step of receiving the contents data transmitted from the external apparatus as a result of transmitting the contents request information to the external apparatus, a contents identification information temporary storage step of temporarily storing the contents identification information as in-storage contents identification information when it is determined in the determination step that the contents identification information is registered in the database or when the reception of the contents data is completed in the data reception step, an attributes request information transmission step of transmitting attributes request information for requesting contents attributes information for altering the attributes of the contents data corresponding to the in-storage contents identification information to the attributes information providing address in the acquisition/use file when the temporary storage of the in-storage contents identification information is completed, an attributes information reception step of receiving the contents attributes information corresponding to the attributes request information, a contents attributes identification information temporary storage step of temporarily storing the contents attributes identification information corresponding to the contents attributes information after the completion of the reception of the contents attributes information in the attributes information reception step, a registration step of registering the contents data and the contents attributes information in the database, and a temporarily stored information deletion step of deleting the temporarily stored information after the completion of the registration of the contents data and the contents attributes information in the database.

Thus, with a contents acquisition method according to the invention as defined above, if a request for acquiring contents data is made but the contents data are already acquired before the acquisition request, only the contents attributes information corresponding to the contents data is received from the external apparatus. Therefore, with the contents acquisition method, acquisition of contents data in duplicate is avoided and it is possible to remarkably reduce the acquisition processing time for the process of acquiring the contents data and the contents attributes information.

In another aspect of the present invention, there is provided an attributes information providing method to be used in a situation where contents data are already registered in a database or the reception of the contents data corresponding to the contents providing address in the acquisition request file transmitted from an external apparatus is completed after externally and temporarily storing an acquisition/use file containing a contents providing address corresponding to the acquisition request for contents data to an external apparatus and an attributes information providing address and before requesting the contents data corresponding to the contents providing address, the method including: an attributes request information reception step of receiving attributes request information requesting contents attributes information for altering the attributes of the contents data corresponding to the in-storage contents identification information transmitted in a condition where the contents identification information corresponding to the contents providing address is temporarily stored as in-storage contents identification information, and an attributes information transmission step of externally transmitting the contents attributes information of the contents data corresponding to the in-storage contents identification information in response to the attributes request information received in the attributes request information reception step.

Thus, with an attributes information providing method according to the invention as defined above, if a request for acquiring contents data is made externally but the contents data are already acquired by the contents data acquisition request making part before the acquisition request, the contents attributes information is transmitted to the contents data acquisition request making part only in response to the request for the contents attribute information corresponding to the contents data. Therefore, with the attributes information providing method, it is possible for the contents data acquisition request making part to remarkably reduce the acquisition processing time for the process of acquiring the contents data and the contents attributes information.

In still another aspect of the present invention, there is provided a contents acquisition apparatus including: a file request information transmission means for transmitting file request information that requests an acquisition/use file containing a contents providing address corresponding to a request for acquiring contents data stored in an external apparatus and an attributes information providing address, a file reception means for receiving the acquisition/use file corresponding to the file request information transmitted by the file request information transmission means, a temporary storage means for temporarily storing the acquisition/use file received by the file reception means, a determination means for determining if the contents identification information corresponding to the contents providing address in the acquisition/use file is registered in a database or not, a contents request information transmission means for transmitting contents request information for requesting the contents data corresponding to the contents identification information to the external apparatus if it is determined by the determination means that the contents identification information is not registered in the database, a data reception means for receiving the contents data transmitted from the external apparatus as a result of transmitting the contents request information to the external apparatus by the contents request information transmission means, a contents identification information temporary storage means for temporarily storing the contents identification information as in-storage contents identification information when it is determined by the determination means that the contents identification information is registered in the database or when the reception of the contents data is completed by the data reception means, an attributes request information transmission means for transmitting attributes request information for requesting contents attributes information for altering the attributes of the contents data corresponding to the in-storage contents identification information to the attributes information providing address in the acquisition/use file when the temporary storage of the in-storage contents identification information by the contents identification information temporary storage means is completed, an attributes information reception means for receiving the contents attributes information corresponding to the attributes request information transmitted by the attributes request information transmission means, a contents attributes identification information temporary storage means for temporarily storing the contents attributes identification information corresponding to the contents attributes information after the completion of the reception of the contents attributes information by the attributes information reception means, a registration means for registering the contents data and the contents attributes information in the database, and a temporarily stored information deletion means for deleting the temporarily stored information after the completion of the registration of the contents data and the contents attributes information in the database.

Thus, with a contents acquisition apparatus according to the invention as defined above, if a request for acquiring contents data is made but the contents data are already acquired before the acquisition request, only the contents attributes information corresponding to the contents data is received from the external apparatus. Therefore, with the contents acquisition apparatus, acquisition of contents data in duplicate is avoided and it is possible to remarkably reduce the acquisition processing time for the process of acquiring the contents data and the contents attributes information.

In still another aspect of the present invention, there is provided an attributes information providing method to be used in a situation where contents data are already registered in a database or the reception of the contents data corresponding to the contents providing address in the acquisition request file transmitted from an external apparatus is completed after externally and temporarily storing an acquisition/use file containing a contents providing address corresponding to the acquisition request for contents data to an external apparatus and an attributes information providing address and before requesting the contents data corresponding to the contents providing address, the apparatus including: an attributes request information reception means for receiving attributes request information requesting contents attributes information for altering the attributes of the contents data corresponding to the in-storage contents identification information transmitted in a condition where the contents identification information corresponding to the contents providing address is temporarily stored as in-storage contents identification information, and an attributes information transmission means for externally transmitting the contents attributes information of the contents data corresponding to the in-storage contents identification information in response to the attributes request information received by the attributes request information reception means.

Thus, with an attributes information providing apparatus according to the invention as defined above, if a request for acquiring contents data is made externally but the contents data are already acquired by the contents data acquisition request making part before the acquisition request, the contents attributes information is transmitted to the contents data acquisition request making part only in response to the requests for the contents attribute information corresponding to the contents data. Therefore, with the attributes information providing apparatus, it is possible for the contents data acquisition request making part to remarkably reduce the acquisition processing time for the process of acquiring the contents data and the contents attributes information.

In still another aspect of the present invention, there is provided a contents acquisition program for causing an information processing apparatus to execute: a file request information transmission step of transmitting file request information that requests an acquisition/use file containing a contents providing address corresponding to a request for acquiring contents data stored in an external apparatus and an attributes information providing address, a file reception step of receiving the acquisition/use file corresponding to the file request information, a temporary storage step of temporarily storing the acquisition/use file received in the file reception step, a determination step of determining if the contents identification information corresponding to the contents providing address in the acquisition/use file is registered in a database or not, a contents request information transmission step of transmitting contents request information for requesting the contents data corresponding to the contents identification information to the external apparatus if it is determined in the determination step that the contents identification information is not registered in the database, a data reception step of receiving the contents data transmitted from the external apparatus as a result of transmitting the contents request information to the external apparatus, a contents identification information temporary storage step of temporarily storing the contents identification information as in-storage contents identification information when it is determined in the determination step that the contents identification information is registered in the database or when the reception of the contents data is completed in the data reception step, an attributes request information transmission step of transmitting attributes request information for requesting contents attributes information for altering the attributes of the contents data corresponding to the in-storage contents identification information to the attributes information providing address in the acquisition/use file when the temporary storage of the in-storage contents identification information is completed, an attributes information reception step of receiving the contents attributes information corresponding to the attributes request information, a contents attributes identification information temporary storage step of temporarily storing the contents attributes identification information corresponding to the contents attributes information after the completion of the reception of the contents attributes information in the attributes information reception step, a registration step of registering the contents data and the contents attributes information in the database, and a temporarily stored information deletion step of deleting the temporarily stored information after the completion of the registration of the contents data and the contents attributes information in the database.

Thus, with a contents acquisition program according to the invention as defined above, if a request for acquiring contents data is made but the contents data are already acquired before the acquisition request, only the contents attributes information corresponding to the contents data is received from the external apparatus. Therefore, with the contents acquisition program, it is possible to remarkably reduce the acquisition processing time for the process of acquiring the contents data and the contents attributes information.

In another aspect of the present invention, there is provided an attributes information providing program to be executed by an information processing apparatus in a situation where contents data are already registered in a database or the reception of the contents data corresponding to the contents providing address in the acquisition request file transmitted from an external apparatus is completed after externally and temporarily storing an acquisition/use file containing a contents providing address corresponding to the acquisition request for contents data to an external apparatus and an attributes information providing address and before requesting the contents data corresponding to the contents providing address, the program including: an attributes request information reception step of receiving attributes request information requesting contents attributes information for altering the attributes of the contents data corresponding to the in-storage contents identification information transmitted in a condition where the contents identification information corresponding to the contents providing address is temporarily stored as in-storage contents identification information, and an attributes information transmission step of externally transmitting the contents attributes information of the contents data corresponding to the in-storage contents identification information in response to the attributes request information received in the attributes request information reception step.

Thus, with an attributes information providing program according to the invention as defined above, if a request for acquiring contents data is made externally but the contents data are already acquired by the contents data acquisition request making part before the acquisition request, the contents attributes information is transmitted to the contents data acquisition request making part only in response to the requests for the contents attribute information corresponding to the contents data. Therefore, with the attributes information providing program, acquisition of contents data in duplicate is avoided and it is possible for the contents data acquisition request making part to remarkably reduce the acquisition processing time for the process of acquiring the contents data and the contents attributes information.

Thus, according to the invention, file request information that requests an acquisition/use file containing a contents providing address corresponding to a request for acquiring contents data stored in an external apparatus and an attributes information providing address is transmitted and, as, a result, the acquisition/use file corresponding to the file request information is received and temporarily stored. Then, it is determined if the contents identification information corresponding to the contents providing address in the acquisition/use file is registered in a database or not and contents request information for requesting the contents data corresponding to the contents identification information is transmitted to the external apparatus and the contents data transmitted from the external apparatus in response are received when it is determined that the contents identification information is not registered in the database. On the other hand, the contents identification information is temporarily stored as in-storage contents identification information when it is determined that the contents identification information is registered in the database or when the reception of the contents data is completed and attributes request information for requesting contents attributes information for altering the attributes of the contents data corresponding to the in-storage contents identification information is transmitted to the attributes information providing address when the temporary storage of the in-storage contents identification information is completed. Then, after the completion of the reception of the contents attributes information corresponding to the attributes request information, the contents attributes identification information corresponding to the contents attributes information is temporarily stored and the contents data and the contents attributes information are registered in the database. The temporarily stored information is deleted after the completion of the registration thereof. Thus, if a request for acquiring contents data is made but the contents data are already acquired before the acquisition request, only the contents attributes information corresponding to the contents data is received from the external apparatus. Therefore, acquisition of contents data in duplicate is avoided and it is possible to remarkably reduce the acquisition processing time for the process of acquiring the contents data and the contents attributes information. With the above-described arrangement, the present invention provides a contents acquisition method, an attributes information providing method, a contents acquisition apparatus, an attributes information providing apparatus, a contents acquisition program and an attributes information providing program that can remarkably improve the efficiency of the acquisition process.

BEST MODE FOR CARRYING OUT THE INVENTION

Now, the present invention will be described in greater detail by referring to the accompanying drawings that illustrate a preferred embodiment of the invention.

(1) Overall Configuration of Data Delivery System

Figure 1:
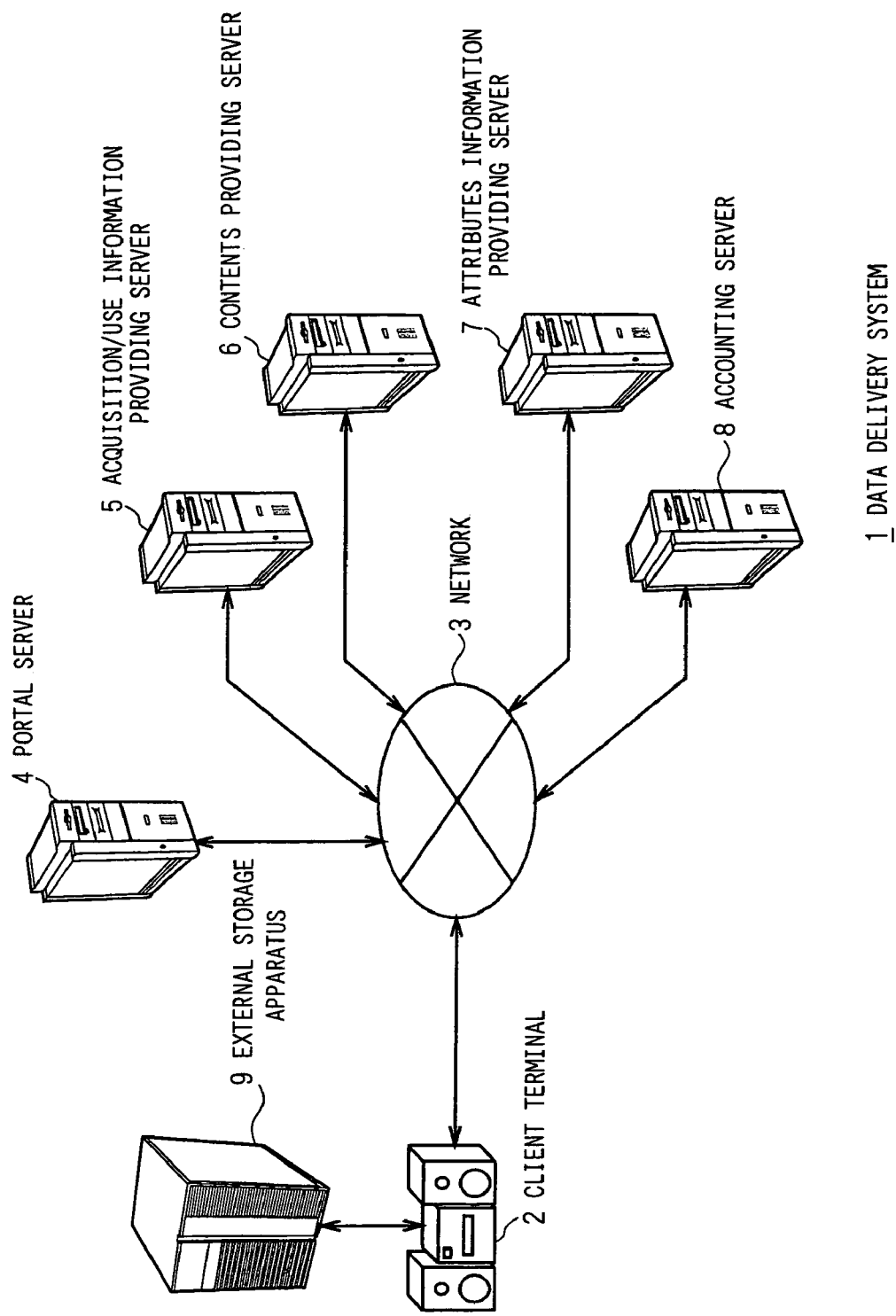
FIG. 1 is a schematic perspective illustration of an embodiment of data delivery system according to the invention, showing the overall configuration thereof.

Referring firstly to FIG. 1, reference symbol 1 generally denotes a data delivery system according to the invention. As a user makes a request for purchasing one or more than one pieces of music, utilizing the music delivery service provided on a network 3 such as the Internet, a client terminal 2 accesses an acquisition/use information providing server 5 that includes a computer by way of a server that runs a portal site and also includes a computer (to be referred to as portal server hereinafter). Then, the client terminal 2 acquires the contents data that corresponds to the piece or pieces of music to be purchased and an acquisition/use file to be used for acquiring the contents attributes information for altering the attributes of the contents including those that relate to replaying.

Then, the client terminal 2 acquires the contents data of each piece of music for which the purchase request is made from the contents providing server 6 that includes a computer according to the contents contained in the acquisition/use file. Additionally, the client terminal 2 acquires the contents attributes file of each piece of music that stores the contents attributes information corresponding to the contents data of the piece of music from attributes information providing server 7 that also includes a computer.

Then, accounting server 8 that also includes a computer of the data delivery system 1 executes an accounting process for the user who made the request for purchasing the one or more than one pieces of music according to the price of the contents data and that of the contents attributes file acquired by the client terminal 2. As a result, the data delivery system I can have the user purchase the desired one or more than one pieces of music in the form of contents data and corresponding contents attributes files.

After acquiring the pieces of the music in the form of contents data and contents attributes files by means of the client terminal 2 of the data delivery system 1 according to the purchase request made by the user, the user may then request to have one of the pieces of music reproduced. Then, the client terminal 2 of the data delivery system 1 reproduces the corresponding contents data according to the contents attributes information in the corresponding contents attributes file. As a result, the client terminal 2 can make the user listen to the piece of music that the user wants to be reproduced.

Additionally, the client terminal 2 of the data delivery system 1 makes a copy of either the contents data or the contents attribute file of each of the pieces of music as backup data and stores them in an external storage apparatus 9 (to be referred to as backup storage hereinafter). As a result, the client terminal 2 avoids accidentally losing either the contents data or the contents attributes file, whichever appropriate, due to an operation failure on the part of the client terminal 2 after the purchase by the user of them by means of the client terminal 2.

As the client terminal 2 is restored from the failure, the external storage apparatus 9 of the data delivery system 1 returns the contents data or the contents attributes file, whichever appropriate, it stores to the client terminal 2. Then, as the contents data or the contents attributes file, whichever appropriate, is returned from the external storage apparatus 9 as backup data, the client terminal 2 acquires a reacquisition/use file to be used for reacquiring the contents attributes file or the contents data not in backup storage from acquisition/use information providing server 5 by way of the portal server 4.

Then, the client terminal 2 of the data delivery system 1 reacquires either the contents data lost due to the failure from the contents providing server 6 or the contents attributes file lost due to the failure from the attributes information providing server 7 according to the reacquisition/use file. In this way, the client terminal 2 can reproduce again the contents data according to the contents attributes information in the contents attributes file.

(1-1) Configuration of Portal Server 4

Figure 2:
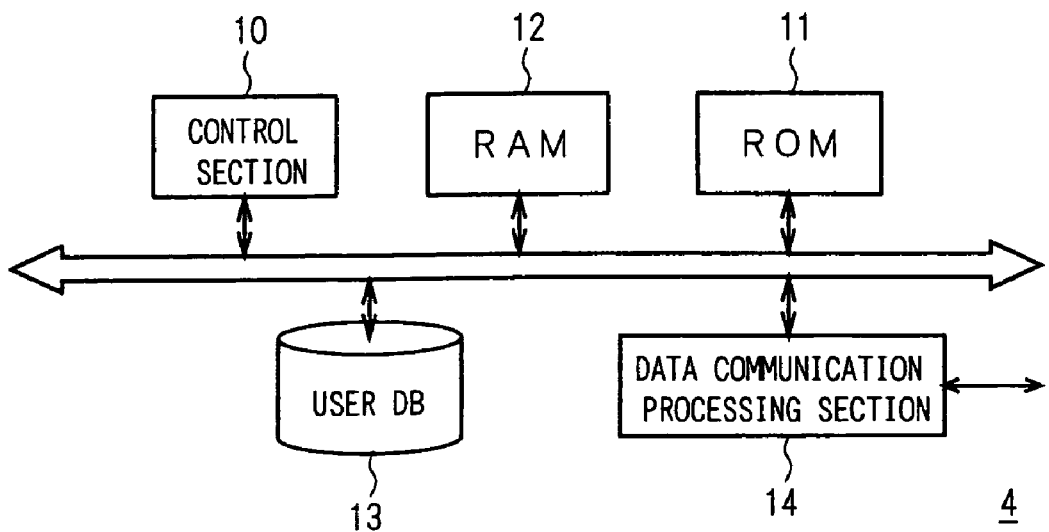
FIG. 2 is a schematic block diagram of the portable server of FIG. 1, illustrating the circuit configuration thereof.

As shown in FIG. 2, the control section 10, which is a CPU (Central Processing Unit), of the portal server 4 comprehensively controls the overall operation of the latter and executes various processes according to basic programs including the OS (Operating System) started by way of a ROM (Read Only Memory) 11 and a RAM (Random Access Memory) 12 and various application programs such as a contents delivery service program.

The control section 10 stores identification information of each user who is authorized to utilize the data delivery system 1 (to be referred to as user ID (Identification) hereinafter) and personal information such as the password of the user in the user database 13. As a music contents purchase request data are transmitted from the client terminal 2 according to a purchase request for purchasing one or more than one pieces of music made by the user, the control section 10 receives the music contents purchase request data by way of data communication processing section 14. Then, the control section 10 executes an authentication process for the user by means of the user ID and the password stored in the music contents purchase request data and according to the personal information stored in the user database 13.

As the control section 10 authenticates the user who requested to purchase one or more then one pieces of music, it stores the user ID of the user and generates accounting ID issuance request data for requesting the issuance of identification information by means of which the accounting process for the user can be identified (to be referred to as accounting ID hereinafter). Then, the control section 10 transmits the accounting ID issuance request data to the accounting server 8 by way of the data communication processing section 14.

As a result, the control section 10 has the accounting server 8 issue accounting ID for the user and acquires it. Then, the control section 10 transmits the acquired accounting ID as accounting ID notification data to the client terminal 2 by way of the data communication processing section 14. Additionally, the control section 10 has the user make sure if he or she really purchases the one or more than one pieces of music or not at the client terminal 2.

Then, as acquisition/use information request data are transmitted from the client terminal 2 because the user makes sure that he or she really purchases the one or more than one pieces of music, the control section 10 receives the acquisition/use information request data by way of the data communication processing section 14. In response to the reception, the control section 10 transmits file request data that stores the identification information that are contained in the music contents purchase request data and by means of which the contents data of the one or more than one pieces of music to be purchased are identifiable (to be referred to as contents IDs hereinafter) and the accounting ID contained in the acquisition/use information request data to the acquisition/use information providing server 5 by way of the data communication processing section 14. As a result, the control section 10 receives the acquisition/use file transmitted from the acquisition/use information providing server 5. As a result, the control section 10 receives the acquisition/use file transmitted from the acquisition/use information providing server 5. Then, the control section 10 transmits the acquisition/use file to the client terminal 2 by way of the data communication processing section 14.

Additionally, after transmitting the acquisition/use file to the client terminal 2, the control section 10 relates the personal information of the user who made the purchase request for the one or more than one pieces of music with the accounting ID and the file name of the acquisition/use file and stores them in the user database 13.

On the other hand, as the client terminal 2 recovers from the failure and transmits reacquisition/use information request data for reacquiring the contents data, the control section 10 receives the reacquisition/use information request data via the data communication processing section 14. Then, the control section 10 searches for and finds out the file names of all the acquisition/use files that have been provided to the client terminal 2 by this time from the user database 13 according to the user ID contained in the reacquisition/use information request data.

Then, the control section 10 generates file request data that contain all the contents IDs of the contents data to be reacquired that are contained in the reacquisition/use information request data. Then, the control section 10 transmits the file request data to the acquisition/use information providing server 5 by way of the data communication processing section 14.

As the acquisition/use file used for acquiring the contents data to be reacquired is identified by the acquisition/use information providing server 5 and the reacquisition/use file that contains part of the contents of the identified acquisition/use file is transmitted from the acquisition/use information providing server 5, the control section 10 once receives the file. Then, the control section 10 transmits the reacquisition/use file to the client terminal 2 by way of the data communication processing section 14.

Additionally, as the reacquisition/use information request data for reacquiring the contents attribute file as a result of the recovery from the failure of the client terminal 2, the control section 10 receives the reacquisition/use information request data by way of the data communication processing section 14. Then, the control section 10 searches for and finds out the file names of all the acquisition/use files that have been provided to the client terminal 2 by this time from the user database 13 according to the user ID contained in the reacquisition/use information request data.

Then, the control section 10 generates file request data that contains the found out file names and all the contents IDs corresponding to the contents attributes files to be reacquired that are contained in the reacquisition/use information request data. Thereafter, the control section 10 transmits the file request data to the acquisition/use information providing server 5 by way of the data communication processing section 14.

As the acquisition/use file used for acquiring the contents attributes file to be reacquired is identified by the acquisition/use information providing server 5 and the reacquisition/use file that contains part of the contents of the identified acquisition/use file is transmitted from the acquisition/use information providing server 5, the control section 10 once receives the file. Then, the control section 10 transmits the reacquisition/use file to the client terminal 2 by way of the communication processing section 14.

In this way, when an acquisition process for acquiring contents data and contents attributes files (to be referred to simply as acquisition process hereinafter) is executed by the client terminal 2 in response to a purchase request for purchasing pieces of music or a reacquisition process for reacquiring contents data or contents attributes files that are lost due to an operation failure or the like (to be referred to simply as reacquisition process hereinafter) is executed by the client terminal 2 and hence an acquisition/use file or a reacquisition/use file is requested by the client terminal 2, the control section 10 can provide the acquisition/use file or the reacquisition/use file from the acquisition/use information providing server 5 to the client terminal 2.

(1-2) Configuration of Acquisition/Use Information Providing Server 5

Figure 3:
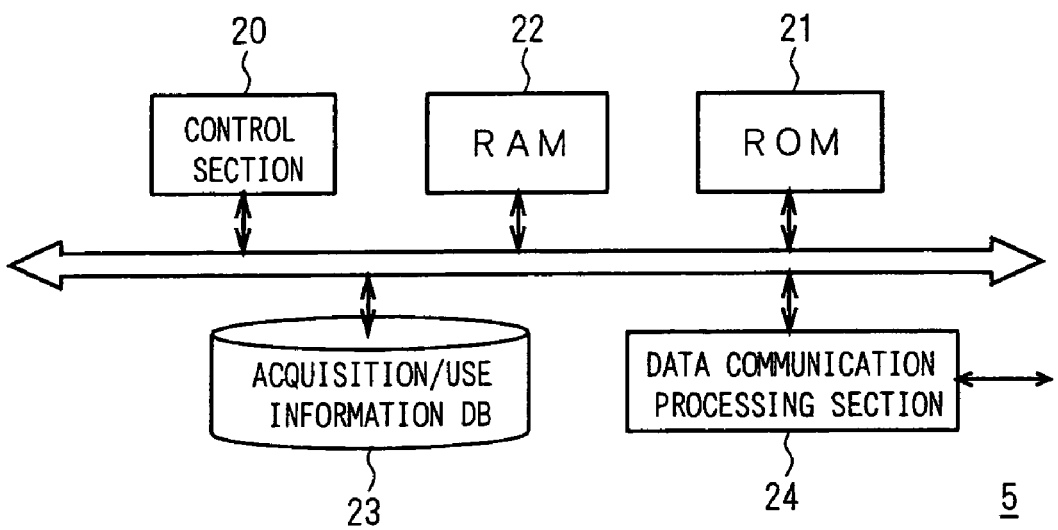
FIG. 3 is a schematic block diagram of the acquisition/use information providing server of FIG. 1, illustrating the circuit configuration thereof.

As shown in FIG. 3, the control section 20, which is a CPU, of the acquisition/use information providing server 5 comprehensively controls the overall operation of the latter and executes various processes according to basic programs including the OS started by way of a ROM 21 and a RAM 22 and various application programs such as an acquisition/use information providing program and a reacquisition/use information providing program.

The control section 20 relates the contents ID of contents data, the address (URL: Uniform Resource Locator) of the home page opened by to provide the contents data from the contents providing server 6 (to be referred to as contents providing home page hereinafter) and the address (URL) of the home page opened to provide the corresponding contents attributes file from the attributes information providing server 7 (to be referred to as attributes file providing home page hereinafter) to each other for each piece of music and stores them in the acquisition/use information database 23.

Thus, as the control section 20 receives file request data for requesting an acquisition/use file transmitted from the portal server 4 by way of data communication processing section 24, it searches for and finds out the address of the contents providing home page (to be referred to as contents providing address hereinafter) that corresponds to the contents ID of the piece of or each of the pieces of music for which a purchase request is made and the address of the home page for providing the corresponding attributes file (to be referred to as attributes file providing address hereinafter) from acquisition/use information database 23 according to the contents ID or IDs contained in the file request data.

Figure 4:
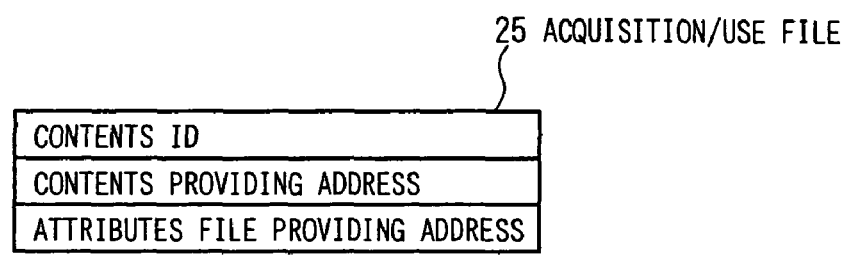
FIG. 4 is a schematic illustration of an acquisition/use file, illustrating the configuration thereof.

Then, as shown in FIG. 4, the control section 20 generates an acquisition/use file 25 that stores the contents ID corresponding to the piece of or each of the pieces of music for which the purchase request is made and the contents providing address and the attributes file providing address found out from the acquisition/use information database 23 as acquisition/use information. Then, the control section 20 transmits the acquisition/use file 25 to the client terminal 2 from the data communication processing section 24 by way of the portal server 4.

After transmitting the acquisition/use file 25 to the client terminal 2 by way of the portal server 4, the control section 20 relates the acquisition/use file 25 it transmits, the file name thereof and the accounting ID contained in the file request data to each other and stores and preserve them in the acquisition/use information database 23.

Additionally, as the control section 20 receives the file request data for requesting a reacquisition/use file for the contents data transmitted from the portal server 4 by way of the data communication processing section 24, it searches for and finds out the acquisition/use file 25 provided to the client terminal 2 from the acquisition/use information database 23 according to the file name and the contents ID or IDs contained in the file request data. Then, the control section 20 extracts only the contents ID and the contents providing address in the found out acquisition/use file 25 as contents reacquisition/use information and generates a reacquisition/use file that contains them. Thereafter, the control section 20 transmits the reacquisition/use file to the client terminal 2 from the data communication processing section 24 by way of the portal server 4.

On the other hand, as the control section 20 receives the file request data for requesting a reacquisition/use file for the contents attributes file transmitted from the portal server 4 by way of the data communication processing section 24, it searches for and finds out the acquisition/use file 25 provided to the client terminal 2 from the acquisition/use information database 23 according to the file name and the contents ID contained in the file request data. Then, the control section 20 extracts only the attributes file providing address in the found out acquisition/use file 25 as attributes file reacquisition/use information and generates a reacquisition/use file that contains it. Thereafter, the control section 20 transmits the reacquisition/use file to the client terminal 2 from the data communication processing section 24 by way of the portal server 4.

In this way, when an acquisition process or a reacquisition process is executed at the client terminal 2, the control section 20 can provide an acquisition/use file 25 or a reacquisition/use file, whichever appropriate, to the client terminal 2 by way of the portal server 4.

Note that, when the control section 20 transmits an acquisition/use file 25 or a reacquisition/use file to the client terminal 2, it issues a process ID, which is also referred to as transaction ID, with which the acquisition process to be executed by means of the acquisition/use file 25 and the reacquisition process to be executed by means of the reacquisition/use file can be individually identified. The control section 20 contains the process ID in the acquisition/use file 25 and the reacquisition/use file.

Thus, when the client terminal 2 accesses the attributes file providing home page in an acquisition process or a reacquisition process, it transmits the process ID contained in the acquisition/use file 25 and the reacquisition/use file used at that time to the attributes information providing server 7.

Additionally, each time the client terminal 2 accesses the attributes file providing home page, the attributes information providing server 7 checks the process ID transmitted from the client terminal 2. With this arrangement, the attributes information providing server 7 prevents the client terminal 2 from accessing a same attributes file providing home page twice or more than twice to consequently unduly acquire the contents attributes file in duplicate.

(1-3) Configuration of Contents Providing Server 6

Figure 5:
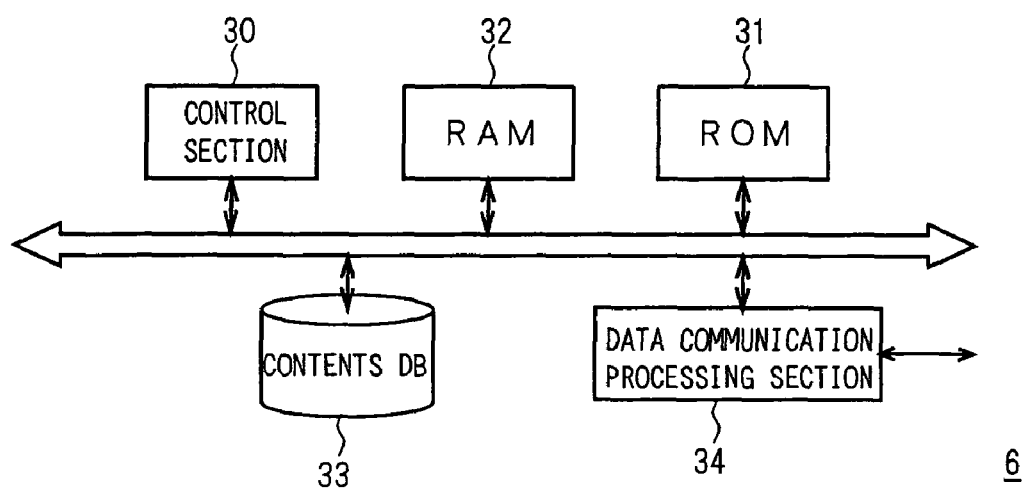
FIG. 5 is a schematic block diagram of the contents providing server of FIG. 1, illustrating the circuit configuration thereof.

As shown in FIG. 5, the control section 30, which is a CPU, of the contents providing server 6 comprehensively controls the overall operation of the latter and executes various processes according to basic programs including the OS started by way of a ROM 31 and a RAM 32 and various application programs such as a contents providing program.

The control section 30 relates a large number of sets of contents data and their respective contents IDs to each other and stores them in the contents database 33. As the client terminal 2 accesses the contents providing home page according to the contents providing address in the acquisition/use file 25 or the reacquisition/use file at the time of an acquisition process or a reacquisition process, whichever appropriate, and transmits contents request data that contains the contents ID in the acquisition/use file 25 or the reacquisition/use file under this condition, the control section 30 receives them by way of data communication processing section 34 thereof.

Then, the control section 30 searches for and finds, out the corresponding contents data from the contents database 33 according to the contents ID contained in the contents request data. Thereafter, the control section 30 transmits the found out contents data to the client terminal 2 by way of the data communication processing section 34.

(1-4) Configuration of Attributes Information Providing Server 7

Figure 6:
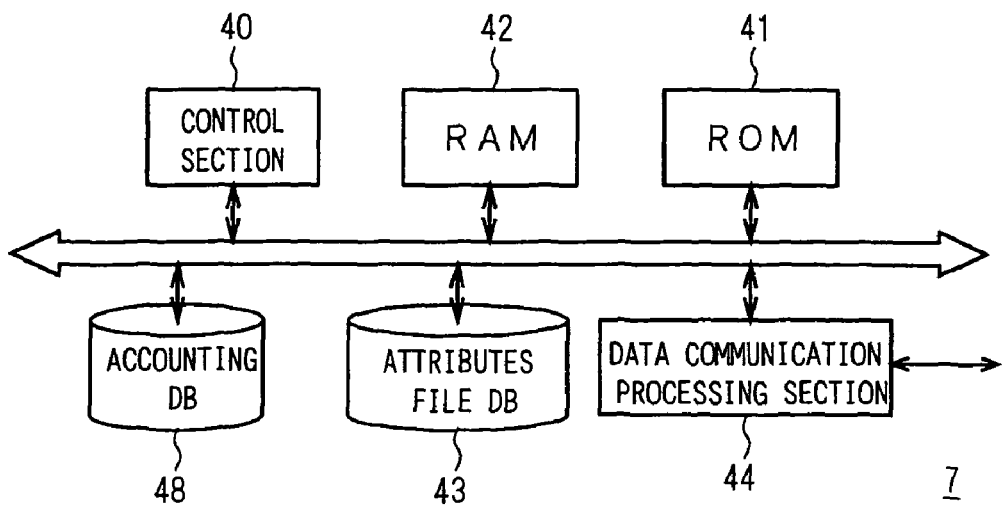
FIG. 6 is a schematic block diagram of the attributes information providing server of FIG. 1, illustrating the circuit configuration thereof.

As shown in FIG. 6, the control section 40, which is a CPU, of the attributes information providing server 7 comprehensively controls the overall operation of the latter and executes various processes according to basic programs including the OS started by way of a ROM 41 and a RAM 42 and various application programs such as an attribute information providing program.

The control section 40 relates each contents attributes file and the corresponding attributes file providing address of the attributes file providing home page that provides the contents attributes file and stores them in the attributes file database 43. Then, as the client terminal 2 accesses the attributes file providing home page according to the attributes file providing address in the acquisition/use file 25 or the reacquisition/use file at the time of an acquisition process or a reacquisition process, whichever appropriate, the control section 40 searches for and finds out the contents attributes file to be provided in the accessed attributes file providing home page from the attributes file database 43 in response. Thereafter, the control section 40 transmits the found out contents attributes file to the client terminal 2 by way of the data communication processing section 44.

Figure 7:
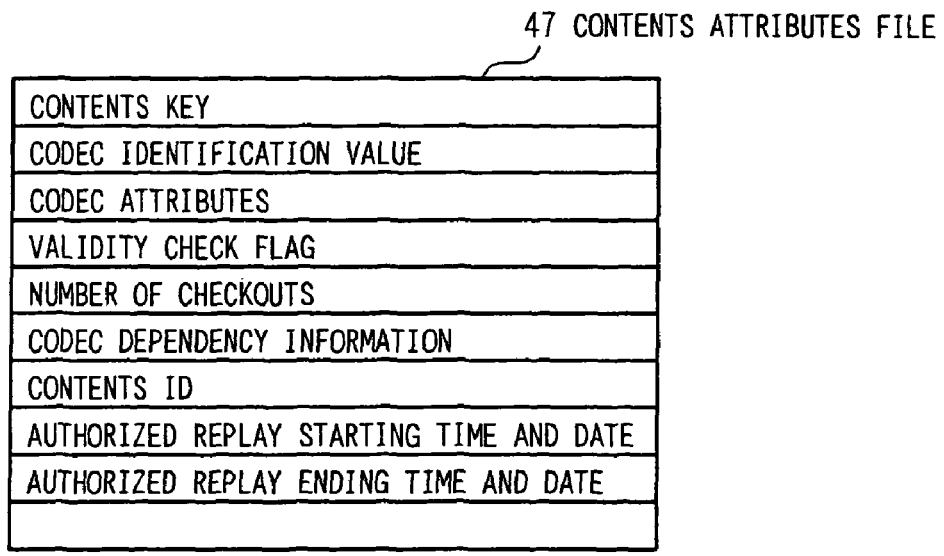
FIG. 7 is a schematic illustration of a contents attributes file, illustrating the configuration thereof.
Figure 8:
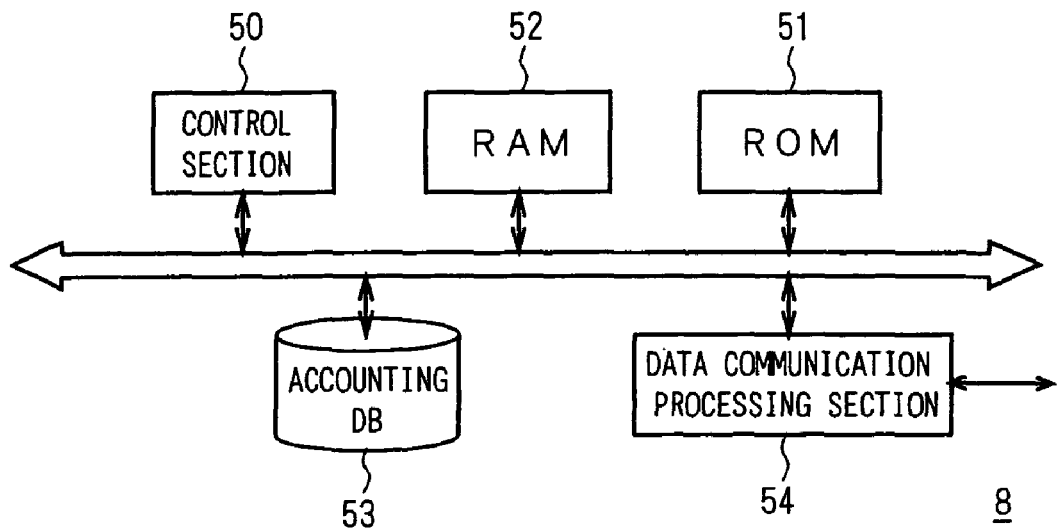
FIG. 8 is a schematic block diagram of the accounting server of FIG. 1, illustrating the circuit configuration thereof.

As shown in FIG. 7, the contents attributes file 47 stores as the contents attributes information necessary for altering the attributes of the corresponding contents data, the contents key to be used for deciphering the ciphered contents data by the client terminal, the codec identification value and the codec attributes to be referred to when the client terminal 2 decodes the deciphered contents data that are compressed and coded at the transmission side, the replay restricting information that indicates the number of times to which the user is authorized to reproduce the contents data as the right of use for the contents data, a validity check flag for checking the validity of the contents data, the number of checkouts that defines the number of times to which the contents data are copied and recorded in an external recording medium by the client terminal 2, codec dependency information, the contents ID of the corresponding contents data and the authorized replay starting time and date and the authorized replay ending time and date that are defined as the right of use for the contents data.

Thus, as clearly seen from FIG. 7, if the client terminal 2 receives contents data, it cannot reproduce the contents data by deciphering and decoding them unless it also acquires the corresponding contents attributes file. With the arrangement that the control section 40 prepares a control attributes file 47 that corresponds to the contents data of a piece of music, it can prevent the contents data from being illegally utilized by a third party if the contents data alone are acquired by the third parity.

As the client terminal 2 accesses the attributes file providing home page only once according to a purchase request for purchasing a single piece of music or when it accesses the attributes file providing home page for the first time in an operation of accessing the latter for a plurality of times according to a purchase request for purchasing one or more than one pieces of music, the control section 40 receives the accounting ID transmitted from the client terminal 2 by way of the data communication processing section 44. Then, the control section 40 transmits accounting start request data that contain the accounting ID to the accounting server 8 by way of the data communication processing section 44. With this arrangement, the control section 40 requests the accounting server 8 to start an accounting process for the user according to the accounting start request data.

At this time, the accounting server 8 is simply requested to start an accounting process for the user and has not completed the accounting process yet. Therefore, the control section 40 stores accounting status notifying information that indicates that the accounting process for the user has not been completed yet in the accounting status database 48, relating the information to the accounting ID it transmits to the accounting server 8.

Additionally, as the accounting server 8 completes the accounting process for the user and transmits accounting completion data to the control section 40 in response to the request made by the control section 40 to start an accounting process for the user, the control section 40 receives the accounting completion data by way of the data communication processing section 44. Then, the control section 40 searches for and finds out the corresponding accounting status notifying information from accounting status database 48 according to the accounting ID contained in the accounting completion data. Then, the control section 40 alters the found accounting status notifying information that indicates that the accounting process has not been completed yet into accounting status notifying information that indicates that the accounting process has been completed and stores it in the accounting status database 48.

In this way, the control section 40 manages the accounting ID and the accounting status notifying information stored in the accounting status database 48. Thus, the control section 40 can notify the accounting status of the user, telling that the accounting process has been completed or not, whenever necessary.

(1-5) Configuration of Accounting Server 8

As shown in FIG. 7, the control section 50, which is a CPU, of the accounting server 8 comprehensively controls the overall operation of the latter and executes various processes according to basic programs including the OS started by way of a ROM 51 and a RAM 52 and various application programs such as an accounting program.

The control section 50 stores the user ID of the user to be used in accounting processes for the user and accounting process serving information such as the bank account number of the user in accounting information database 53. Additionally, the control section 50 relates each contents ID to price of the corresponding contents data and that of the corresponding contents attributes file 47 and stores them in the accounting information database 53. Thus, as the control section 50 receives the accounting ID issuance request data transmitted from the portal server 4 by way of data communication processing section 54, it issues the corresponding accounting ID in response to the request data. Then, the control section 50 transmits the accounting ID to the portal server 4 by way of the data communication processing section 54 as accounting ID data. Additionally, the control section 50 relates the accounting ID to the corresponding accounting process/use information and stores it in the accounting information database 53.

When the control section 50 issues the accounting ID, it acquires the contents ID that corresponds to the piece of music for which a purchase request is made by the user from the acquisition/use information providing server 5 by transmitting the accounting ID to the acquisition/use information providing server 5 by way of the data communication processing section 54. Then, the control section 50 searches for and finds out price information on the contents data and the contents attributes file 47 to be purchased by the user as the piece of music from the accounting information database 53 according to the contents ID.

As the control section 50 receives the accounting start request data transmitted from the attributes information providing server 7 by way of the data communication processing section 54 under this condition, it searches for and finds out the accounting process/use information of the user who made the purchase request from the accounting information database 53 according to the accounting ID contained in the accounting start request data. Then, the control section 50 starts an accounting process for the user, using the accounting process/use information and the price information that is found earlier. When the accounting process is completed, the control section 50 transmits accounting completion data that contain the accounting ID to the attributes information providing server 7 by way of the data communication processing section 54.

If an accounting process is requested by the attributes information providing server 7 when the user has made a purchase request only for a single piece of music, the control section 50 executes an accounting process only for the single piece of music requested by the user. If, on the other hand, an accounting process is requested when the user has made a purchase request for a plurality of pieces of music, the control section 50 executes an accounting process collectively for all the pieces of music requested by the user.

(1-6) Configuration of External Storage Apparatus 9

Figure 9:
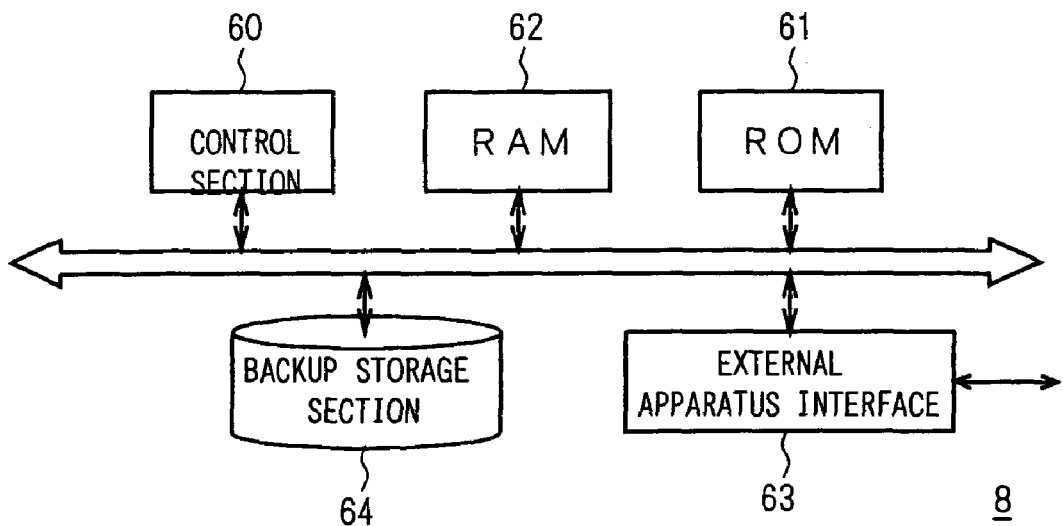
FIG. 9 is a schematic block diagram of the external storage apparatus of FIG. 1, illustrating the circuit configuration thereof.

As shown in FIG. 9, the control section 60, which is a CPU, of the external storage apparatus 9 comprehensively controls the overall operation of the latter and executes various processes according to basic programs including the OS started by way of a ROM 61 and a RAM 62 and various application programs.

As contents data and a contents ID or a contents attributes file 47 are transmitted from the client terminal 2 as backup data along with a backup request, the control section 60 receives them by way of an external apparatus interface 63. Then, the control section 60 stores the backup data in backup storage section 64, which typically includes a hard disk drive. Thus, the control section 60 can avoid accidentally losing the backup data due to an operation failure on the part of the client terminal 2.

Additionally, as the control section 60 receives a return request for the backup data transmitted from the client terminal 2 by way of the external apparatus interface 63, it reads out the backup data that correspond to the return request from the backup storage section 64. Then, the control section 60 transfers the backup data to the client terminal 2 from the external apparatus interface 63.

(1-7) Configuration of Client Terminal 2

Figure 10:
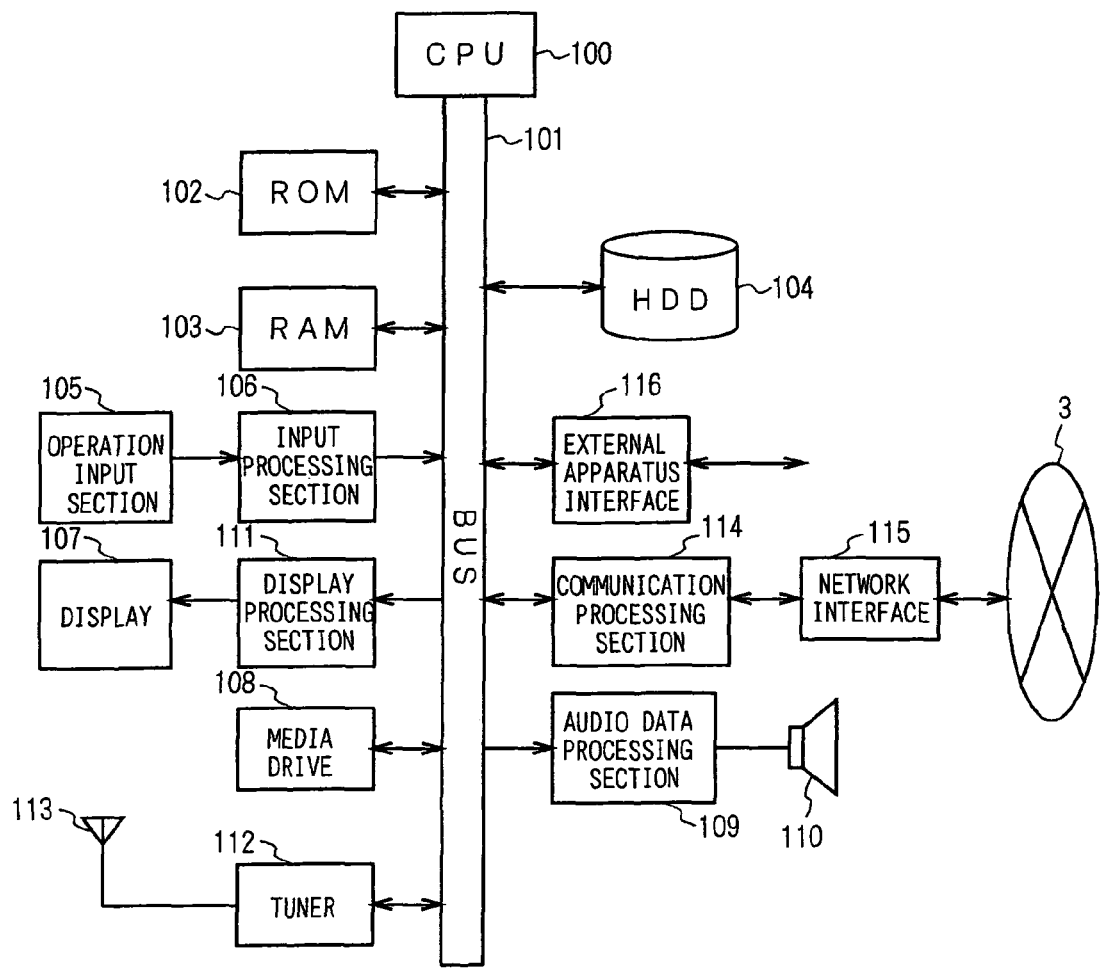
FIG. 10 is a schematic block diagram of the client terminal of FIG. 1, illustrating the circuit configuration thereof.

As shown in FIG. 10, the CPU 100 of the client terminal 2 comprehensively controls the overall operation of the latter and executes predetermined processes according to basic programs including the OS read out from ROM 102 connected via a bus 101 and extended in RAM 103 and various application programs. Thus, the CPU 100 operates for communications for purchasing pieces of music typically by way of the network 3, receives input/output operations by the user, reproduces contents data from media and executes and manages operations of writing the contents data downloaded from radio stations and the contents data and the related contents attributes files 47 acquired by purchases of pieces of music in hard disk drive (HDD) 104 in a well managed manner.

An operation input section 105 sends out input information that corresponds to a user operation using any of various operation elements on the cabinet surface of the main body section or a remote control unit (not shown) to the input processing section 106. The input processing section 106 executes a predetermined process for the input information and sends out the processed information to the CPU 100 as operation command. Then, the CPU 100 executes a process that corresponds to the operation command.

Display 107 is a display device that may typically be a liquid crystal display. It may be directly fitted to the cabinet surface the main body section or may be an external display device. The display 107 displays the outcome of the processing operations of the CPU 100 and various pieces of information.

Media drive 108 is a drive for reproducing data from media that may typically be a CD (Compact Disc) or a memory stick (Registered Trademark), which includes a flash memory. The media drive 108 executes a digital/analog conversion process on the data it reproduces by means of audio data processing section 109 and subsequently outputs them from a 2-ch speaker 110.

If the data reproduced from media by means of the media drive 108 are contents data of a piece of music, the CPU 100 can store them in the hard disk drive 104 as audio data file.

Additionally, the CPU 100 can read out a plurality of still images stored in a memory stick by means of the media drive 108 and display them on the display 107 by way of display processing section 111 as slide show.

Still additionally, the CPU 100 can read out a plurality of pieces of music stored in the hard disk drive 104 by random access and reproduce and output them in the sequence specified by the user so as to operate like a jukebox.

Tuner section 112 is typically an AM/FM radio tuner. The tuner section 112 demodulates the broadcast signals received by way of antenna 113 under the control of the CPU 100 and outputs the outcome of the demodulation from the speaker 110 by way of the audio data processing section 109 as broadcast sounds.

Communication processing section 114 encodes the data to be transmitted and transmits them to a corresponding external apparatus on the network (any of the various servers) by way of network interface 115. Additionally, the communication process section 114 decodes the data received from a corresponding external apparatus on the network (any of the various servers) by way of the network interface 115 such as contents data and transfers them to the CPU 100.

External apparatus interface 116 transfers backup data including contents data and, a contents ID or a contents attributes file 47 to the external storage apparatus 9 that operates as backup storage by way of a predetermined cable. Additionally, the external apparatus interface 116 takes in the backup data read out (and returned) from the external storage apparatus 9 and transfers them to the CPU 100.

(1-8) Directory Management of Contents Data

Figure 11:
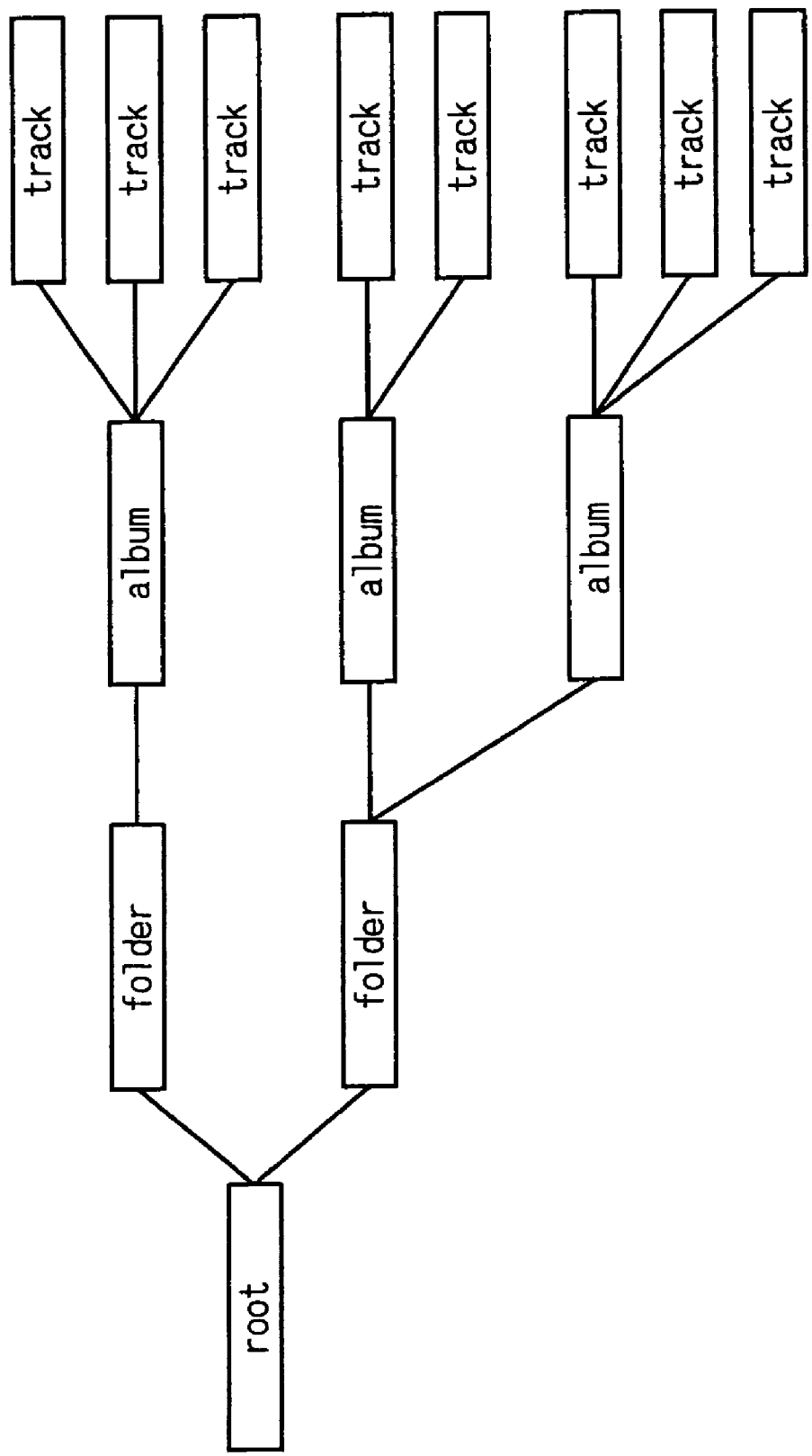
FIG. 11 is a schematic illustration of the directory management of contents data.

The CPU 100 of the client terminal 2 is adapted to manage the contents data stored in the hard disk drive 104 by means of directories that are arranged as shown in FIG. 11. An arbitrarily selected number of "folder" directories, the number being within a predefined range, are prepared as lower layers of a "root" directory. The "folder" directories are prepared for the genres to which sets of contents data belong and the proprietors/users of the contents data.

Then, an arbitrarily selected number of "album" directories, the number being within a predefined range, are prepared as lower layers of each "folder" directory. An "album" directory typically corresponds to an album title. One or more than one "track" files are contained in each "album" directory as lower layers of the "album" directory. A "track" file contains a piece of music, or the contents data of the piece of music.

The directory management of contents data is conducted by means of the database file stored in the hard disk drive 104.

(1-9) Program Module Configuration of Client Terminal 2

Figure 12:
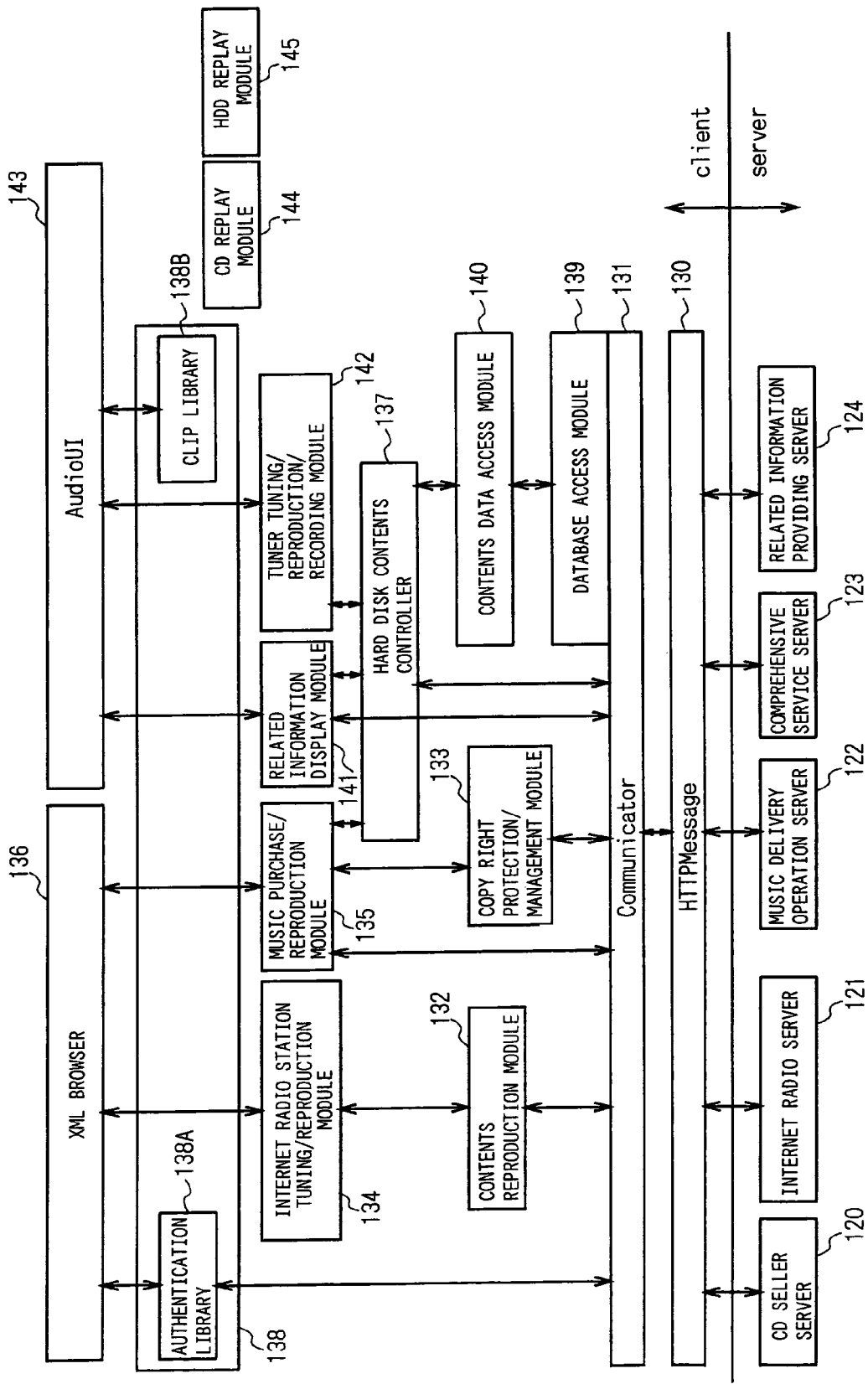
FIG. 12 is a schematic illustration of a program module that can be used for the client terminal of FIG. 1.

As shown in FIG. 12, program modules of the client terminal 2 are designed to operate on the OS. More specifically, the client terminal 2 uses program modules to exchange data with CD selling server 120 that sells CDs, Internet radio server 121, music delivery operation server 122 that includes an acquisition/use information providing server 5, a contents providing server 6 and an attributes information providing server 7, comprehensive service server 123 that includes a portal server 4 and an accounting server 8, related information providing server 124 that provides the client terminal 2 with music information relating to the pieces of music broadcast from a radio station by way of the network 3 as related information and other servers.

HTTP (Hyper Text Transfer Protocol) message program 130 is designed for the client terminal 2 to exchange data with the CD selling server 120, the Internet radio server 121, the music delivery server 122, the comprehensive service server 123, the related information providing server 124 and other servers by HTTP communication. Communicator program 131 is a program module for exchanging data with the HTTP message program 130.

A contents reproduction module 132 for interpreting the codec of contents data and reproducing contents data and a copy right protection/management module 133 for handling information on the copy right protection including the right of use are arranged as higher order modules relative to communicator program 131. Internet radio station tuning/reproduction module 134 for tuning in an Internet radio station for data reproduction and music contents purchase/reproduction module 135 for purchasing pieces of music according to the contents of the contents attributes file 47 and reproducing them for audition are arranged as higher order modules relative to the contents reproduction module 132 and the copy right protection/management module 133.

XML (extensible Markup Language) browser 136 is arranged at a higher order position relative to the Internet radio tuning/reproduction module 134 and the music contents purchase/reproduction module 135. The XML browser 136 interprets the XML files from various servers and displays images on the display 107.

For example, an acquisition/use file 25 is acquired by means of the music contents purchase/reproduction module 135 for the piece of music selected by the user so as to be purchased by way of the XML browser 136 and subsequently the piece of music is acquired by means of the music contents purchase/reproduction module 135 and the copyright protection/management module 133 as contents data and a contents attributes file 47 and written in the hard disk drive 104 by way of hard disk contents controller 137.

When backup data are returned from the external storage apparatus 9, a corresponding reacquisition/use file is acquired by means of the music contents purchase/reproduction module 135 and subsequently the contents data and the contents attributes file 47 that are not backed up are acquired by means of the music contents purchase/reproduction module 135 and the copyright protection/management module 133 and written in the hard disk drive 104 by way of the hard disk contents controller 137.

The communicator program 131 is connected to authentication library 138A of library 138. The authentication library 138A executes authentication processes for various servers including the comprehensive service server 123.

Database access module 139, contents data access module 140 and hard disk contents controller 137 are arranged at higher order positions relative to the communicator program 131.

The database access module 139 accesses any of the various databases built in the hard disk drive 104. The contents data access module 140 accesses the contents data and the contents attributes files 47 stored in the hard disk drive3 104. The hard disk contents controller 137 manages the contents data and the contents attributes files 47 stored in the hard disk drive 104.

Related information display module 141 for displaying the titles and the names of the playing artists of the pieces of music broadcast by a radio station and tuner tuning/reproduction/recording module 142 for tuning in a radio station and recording the contents data received from the radio station in the hard disk drive 104 are arranged as higher order modules relative to the hard disk contents controller 137.

For example, the pieces of music received from the radio station that is turned in by way of audio user interface (UI) 143 are written in the hard disk drive 104 by means of the contents data access module 140.

The related information display module 141 receives the title and the names of the playing artists of the piece of music being currently broadcast by a radio station from the related information providing server 124 by way of the HTTP message 130 and by means of the tuner tuning/reproduction/recording module 142 as related information and displays them on the display 107 by way of audio user interface 143.

The related information displayed on the display 107 by way of the audio user interface 143 may be temporarily stored in clip library 138B of the library 138 and is ultimately stored in the hard disk drive 104 by way of the database access module 139 according to the instruction given by the user.

The program modules of the client terminal 2 additionally include a CD replay module 144 for replaying CDs and an HDD replay module 145 for replaying the hard disk drive 104. The outcome of reproduction is output by way of the audio data processing section 109 and the speaker 110.

(2) Music Contents Purchase Sequence

Now, the music contents purchase sequence to be followed by the client terminal 2 and the various servers in response to a purchase request for purchasing one or more than one pieces of music will be described below.

Figure 13:
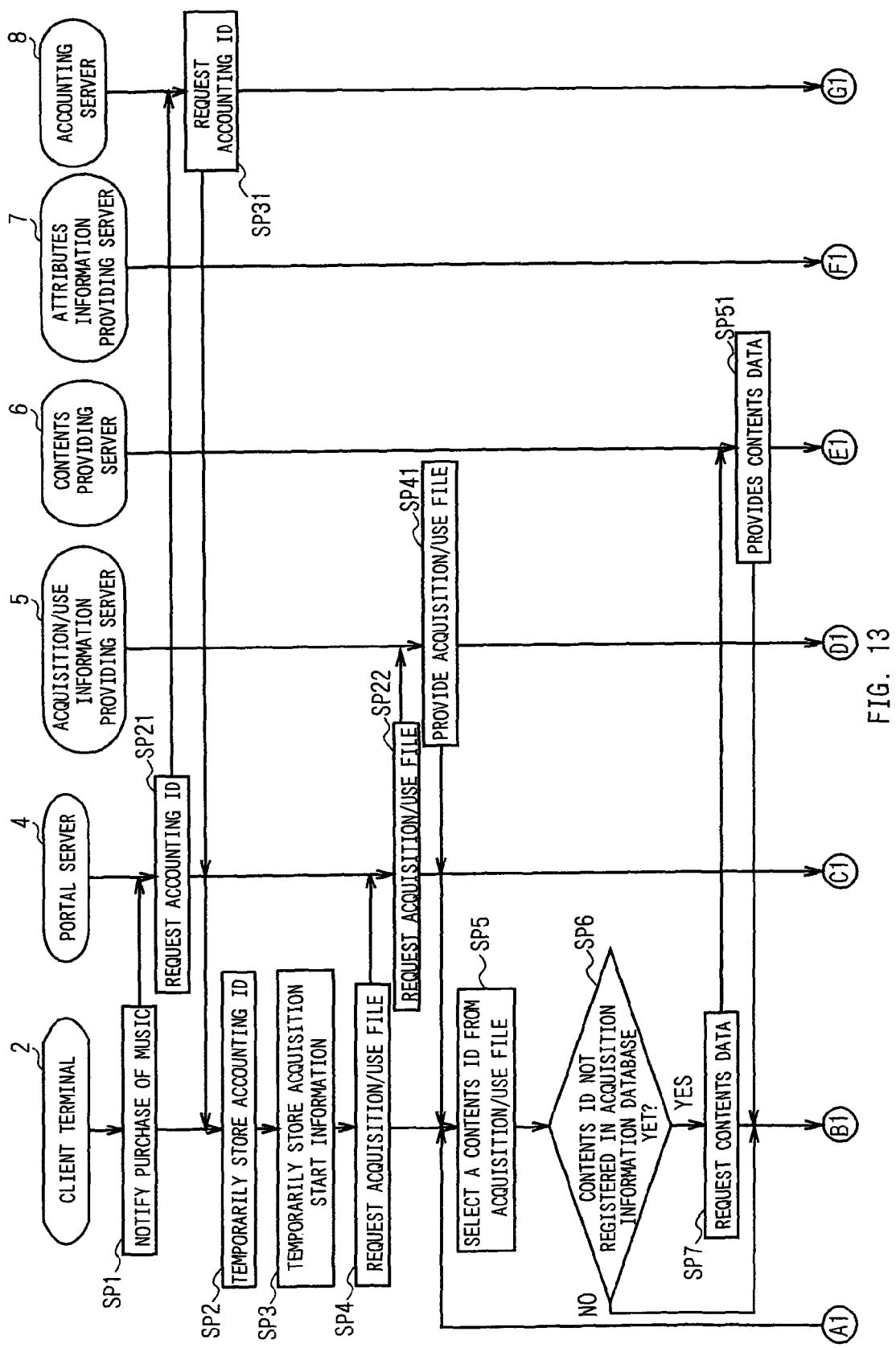
FIG. 13 is a flowchart (1) of the music contents purchase sequence when the client terminal of FIG. 1 is operating properly.
Figure 14:
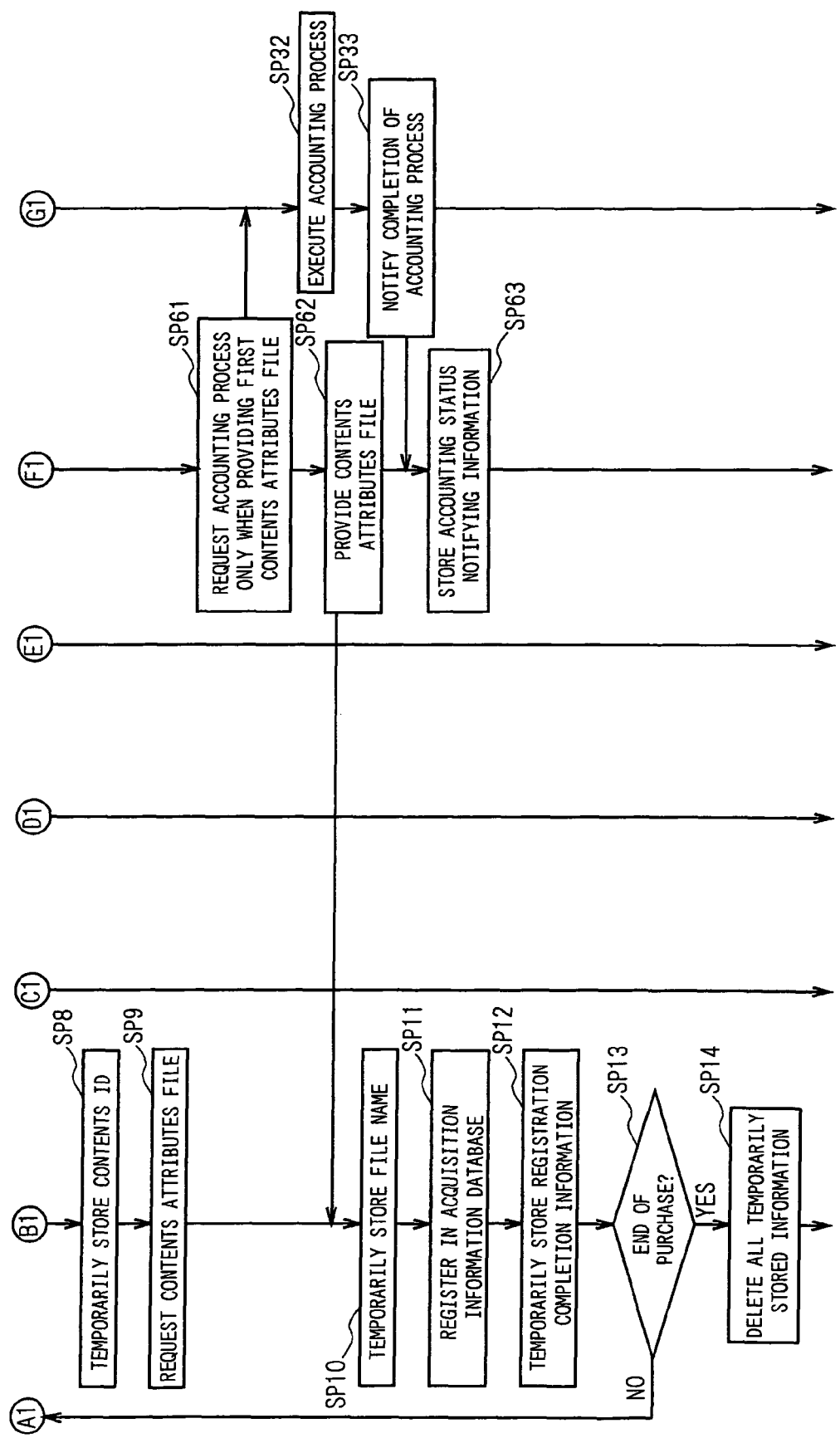
FIG. 14 is a flowchart (2) of the music contents purchase sequence when the client terminal of FIG. 1 is operating properly.

(2-1) Music Contents Purchase Sequence when Client Terminal 2 is Operating Properly As shown in FIGS. 13 and 14, in Step SP1, the client terminal 2 generates music contents purchase request data containing the user ID of the user, the password assigned to the user and the contents ID or IDs that correspond to the music contents purchase request for purchasing one or more than one pieces of music by the user. After transmitting the music contents purchase request data to the portal server 4, the client terminal 2 moves to the next step, or Step SP2.

At the same time, in Step SP21, the portal server 4 personally authenticates the user according to the music contents purchase request data transmitted from the client terminal 2. Thereafter, the portal server 4 requests the accounting server 8 to issue an accounting ID for identifying the accounting process for the user and then moves to Step SP22.

In Step SP31, the accounting server 8 issues an accounting ID in response to the request from the portal server for issuing an accounting ID. Then, the accounting server 8 transmits the accounting ID to the client terminal 2 by way of the portal server 4 and moves to the next step, or Step SP32.

In Step SP2, the client terminal 2 receives the accounting ID by way of the portal server 4. Then, the client terminal 2 temporarily stores the accounting ID in the hard disk of the hard disk drive 104 as process progress information that indicates the progress of the current acquisition process and moves to the next step, or Step SP3.

In Step SP3, the client terminal 2 asks the user to confirm the purchase of one or more than one pieces of music on a predetermined displayed image and temporarily stores acquisition start information that indicates the start of the acquisition process in response to the purchase request for purchasing the one or more than one pieces of music. Then, the client terminal 2 moves to the next step, or Step SP4.

In Step SP4, the client terminal 2 generates acquisition/use information request data that contain the user ID and the accounting ID. Then, the client terminal 2 transmits the acquisition/use information request data to the portal server 4 and moves to the next step, or Step SP4.

At the same time, in Step SP22, the portal server 4 generates file request data that contain the accounting ID and the contents ID or IDs corresponding to the one or more than one pieces of music to be purchased in response to the acquisition/use information request data transmitted from the client terminal 2. Then, the portal server 4 transmits the file request data to the acquisition/use information providing server 5.

As a result, in Step SP41, the acquisition/use information providing server 5 generates an acquisition/use file 25 according to the file request data transmitted from the portal server 4. Then, the acquisition/use information providing server 5 transmits the acquisition/use file 25 to the client terminal 2 by way of the portal server 4. Additionally, the acquisition/use information providing server 5 relates the accounting ID contained in the file request data to the acquisition/use file 25 transmitted to the client terminal 2 and stores them in the acquisition/use information database 23.

Then, in Step SP5, the client terminal 2 temporarily stores the acquisition/use file 25 it receives from the acquisition/use information providing server 5 by way of the portal server 4 in the hard disk. Additionally, the client terminal 2 selects a single requested contents ID indicating the request for the contents data that the client terminal 2 makes to acquire the contents data from the contents providing server 6 and then moves to the next step, or Step SP6.

At the stage of operation, the client terminal 2 prepares an "album" directory as illustrated in FIG. 11 for the purpose of storing and managing the contents data and the contents attributes file 47 it acquires according to the purchase request for music contents.

Additionally, the client terminal 2 builds an acquisition information database each time it acquires the contents data and the contents attributes file 47 of a piece of music to be purchased by relating the title of the piece of music, the contents ID, the name of the "album" directory and the storage address on the hard disk of the contents data and that of the corresponding contents attributes file 47 to each other and storing them for the database.

Then, in Step SP6, the client terminal 2 compares the single requested contents ID selected in Step SP5 and the contents ID in the acquisition information database. Then, the client terminal 2 determines if the requested contents ID is unregistered in the acquisition information database or not according to the outcome of the comparison.

If the answer to the question in Step SP6 is affirmative, it indicates that the single requested contents ID selected in Step SP5 is not registered in the acquisition information database in the hard disk yet. In other words, the affirmative answer indicates that the client terminal 2 acquires the contents data that correspond to the requested contents ID for the first time by way of the acquisition process that is executed in response to the purchase request made for purchasing the piece of music this time. Therefore, if the answer is affirmative, the client terminal 2 moves to the next step, or Step SP7.

In Step SP7, the client terminal 2 selects the contents providing address that corresponds to the requested contents ID selected in Step SP5 from the acquisition/use file 25. Then, the client terminal 2 accesses the home page for providing contents according to the selected contents providing address. On this status, the client terminal 2 transmits contents request data that contain the requested contents ID to the contents providing server 6 and moves to the next step, or Step SP8.

Then, in Step SP51, the contents providing server 6 transmits the contents data specified by the requested contents ID to the client terminal 2 in response to the request from the client terminal 2.

If, on the other hand, the answer to the question in Step SP6 is negative, it indicates that the requested contents ID selected in Step SP5 is already registered in the acquisition information database in the hard disk. In other words, the negative answer indicates that the client terminal 2 has already acquired the contents data that correspond to the requested contents ID before the current acquisition process. Therefore, the client terminal 2 copies the contents data that have already been acquired as "track" file that is managed by the "album" directory prepared in the current acquisition process and moves to Step SP8.

In Step SP8, the client terminal 2 makes the contents ID of the contents data (that is the requested contents ID selected from the acquisition/use file 25) as in-storage contents ID to indicate that the contents data have already been stored at the time when the reception of the contents data transmitted from the contents providing server 6 is completed or when the contents data are copied as "track" file. Then, the client terminal 2 also temporarily stores the in-storage contents ID in the hard disk as process progress information and, after completing the temporary storage, moves to the next step, or Step SP9.

In Step SP9, the client terminal 2 selects the attributes file providing address that corresponds to the requested contents ID selected in Step SP5 from the acquisition/use file 25 as attributes request information for requesting the contents attributes file 47. Then, the client terminal 2 accesses the home page for providing attributes files according to the selected attributes file providing address and moves to the next step, or Step SP10.

In response to the access to the home page for providing attributes files by the client terminal 2, in Step SP61, the attributes information providing server 7 transmits accounting start request data to the accounting server 8 if the access in the acquisition process being executed in response to the current purchase request for music contents data is the first access. Then, the attributes information providing server 7 makes a request to the accounting server 8 to start an accounting process for the user who has made the purchase request for purchasing the piece of music. Additionally, the attributes information providing server 7 stores accounting status notifying information that indicates that the accounting process corresponding to the accounting ID has not been completed yet in the accounting status database 48, relating the information to the accounting ID transmitted from the client terminal 2 and then moves to the next step, or Step SP62.

Then, in Step SP62, the attributes information providing server 7 transmits the contents attributes file 47 that corresponds to the attributes file providing home page that the client terminal 2 accessed to the client terminal 2 and moves to the next step, or Step SP63.

At this time, in Step SP32, the accounting server 8 starts the accounting process for the user who made the purchase request for the music contents in response to the request for starting the accounting process from the attributes information providing server 7. As the accounting server 8 completes the accounting process, it transmits accounting completion data to the attribute information providing server 7 in the next step, or Step SP33.

Thus, in Step SP63, the attributes information providing server 7 alters the accounting status notifying information indicating that the accounting process has not been completed yet and stored in the accounting status database 48 to accounting status notifying information indicating that the accounting process has been completed according to the accounting completion data transmitted from the accounting server 8.

On the other hand, in Step SP10, the client terminal 2 receives the contents attributes file 47 transmitted from the attributes information providing server 7. Then, as the reception of the contents attributes file 47 is completed, the client terminal 2 temporarily stores contents attributes identifying information of the contents attributes file 47, which may typically be the file name, in the hard disk as process progress information and, as the operation of temporarily storing the information is completed, it moves to the next step, or Step SP11.

In Step SP11, the client terminal 2 relates the requested contents ID selected in Step SP5 to the storage address on the hard disk for the contents data and the contents attributes file 47 acquired according to the requested contents ID and registers them in the acquisition information database in the hard disk as registration information and then moves to the next step, or Step SP12.

As the registration of the registration information in the acquisition information database is completed, the client terminal 2 temporarily stores registration completion information that indicates the completion of the registration in the hard disk as process progress information in Step SP12 and moves to the next step, or Step SP13.

In Step SP13, the client terminal 2 determines if all the contents data and the contents attributes files 47 that corresponds to the pieces of music for which the current purchase request is made have been acquired or not (and hence if all the pieces of music for which the current purchase request is made have been purchased or not).

If the answer to the question in Step SP13 is negative, it means that operation of acquiring the contents data and the contents attributes files 47 for the plurality of pieces of music for which the current purchase request is made is not finished yet while the user is requesting to collectively purchase the plurality of pieces of music in the album. Therefore, the client terminal 2 then returns to Step SP5. Thereafter, the client terminal 2 cyclically repeats the operations of Steps SP5-SP6-SP7-SP8-SP9-SP10-SP11-SP12-SP13 until the answer to the question in Step SP13 becomes affirmative. In this way, the client terminal 2 sequentially acquires the contents data and the contents attributes files 47 that correspond to the pieces of music for which the purchase request is made by the user from the contents providing server 6 and the attributes information providing server 7 respectively.

If, on the other hand, the answer to the question in Step SP13 is affirmative, it means that all the contents data and the contents attributes file 47 for the single piece of music or all the contents data and the contents attribute files 47 for the plurality of pieces of music for which the current purchase request is made by the user have been acquired. Therefore, the client terminal 2 then moves to Step SP14.

In Step SP14, the client terminal 2 erases all the process progress information that is sequentially and temporarily stored in the hard disk typically as log file in the course of the execution of the acquisition process and ends the acquisition process.

(2-2) Music Contents Purchase Sequence Accompanying Restoration Process of Client Terminal 2

There can be occasions where the user inadvertently breaks off the power supply to the client terminal 2 as he or she carelessly pulls out the plug of the terminal or where the network cable is pulled out to temporarily shut off the communication connection to the network 3. Then, the ongoing acquisition process will be inevitably stopped. Now, the music contents purchase process that is executed when the client terminal 2 restores the communication enabled state from the shut off communication connection will be described below.

Figure 15:
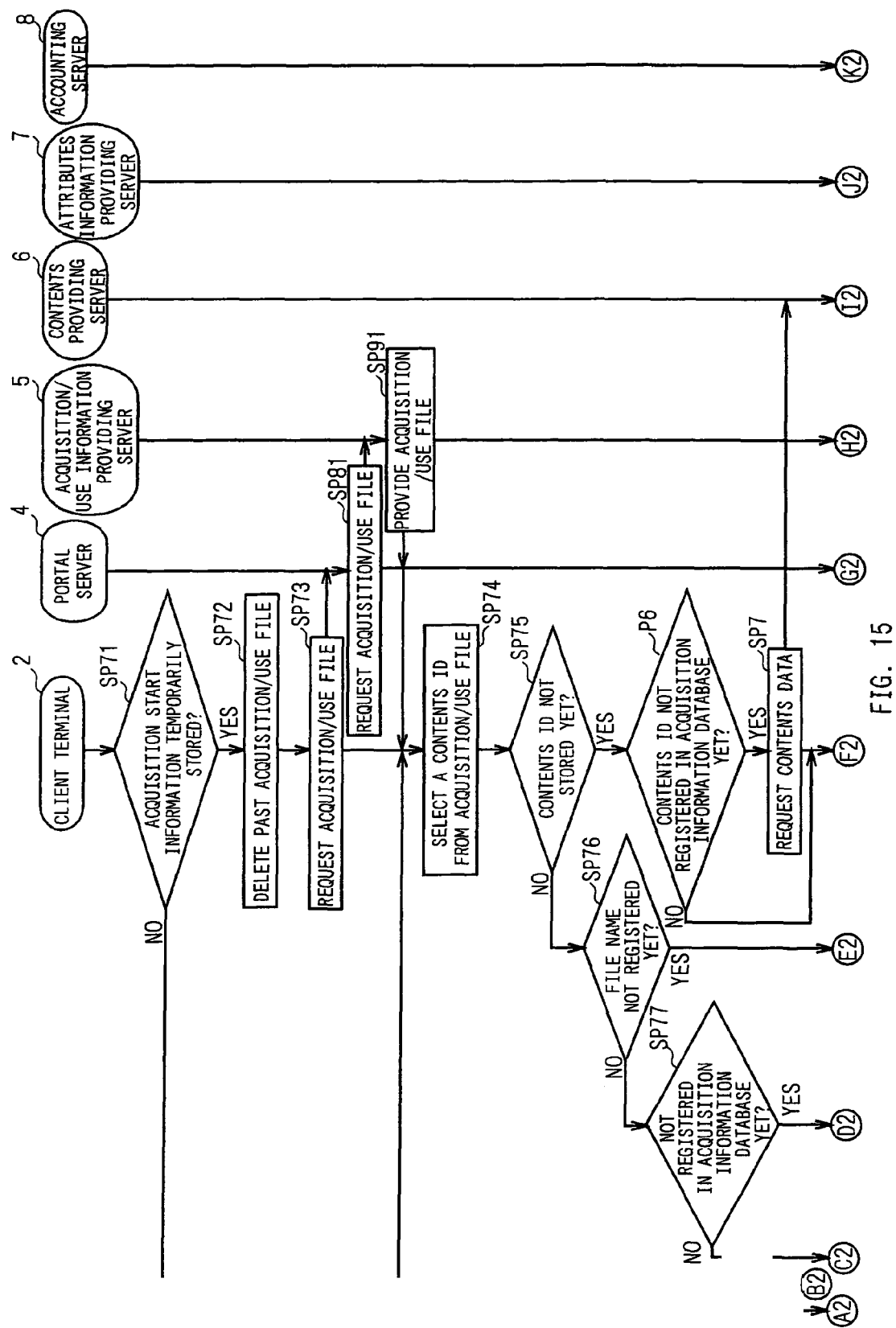
FIG. 15 is a flowchart (1) of the music contents purchase sequence when the client terminal of FIG. 1 is restored from disconnection of the communication line.
Figure 16:
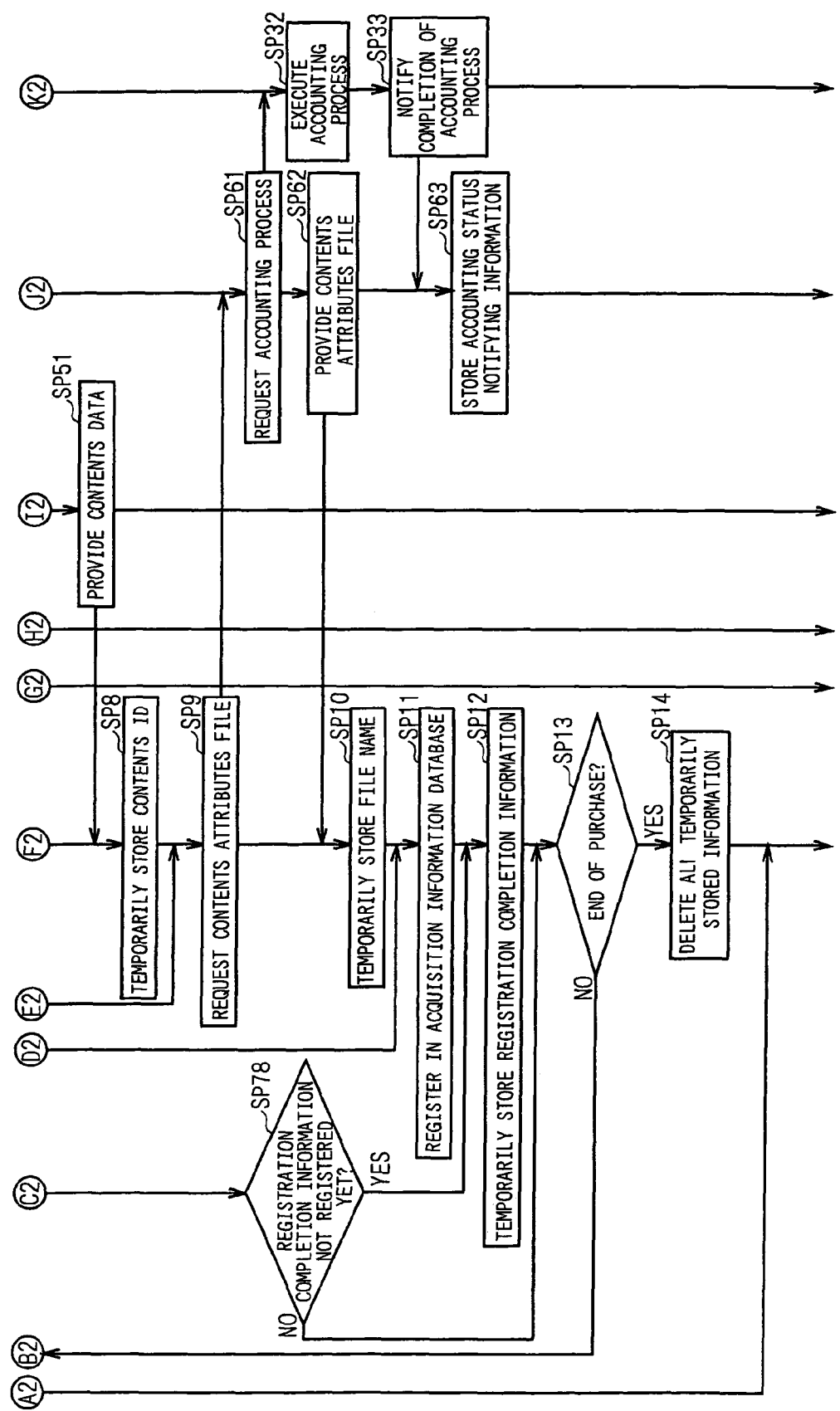
FIG. 16 is a flowchart (2) of the music contents purchase sequence that can used for the purpose of the present invention when the client terminal of FIG. 1 is restored from disconnection of the communication line.

Referring to FIGS. 15 and 16, where the components same as or corresponding to those of FIGS. 13 and 14 are denoted respectively by the same reference symbols, in Step SP71, the client terminal 2 determines if the acquisition start information that is temporarily stored in the hard disk of the hard disk drive 104 as process progress information remains there or not.

If the answer to the question in Step SP71 is negative, it means that the communication connection to the network 3 is shut off when nothing has been done by the client terminal 2 for the acquisition process that corresponds to a purchase request for music contents. In other words, the negative answer indicates that no acquisition start information is left in the hard disk as process progress information at the client terminal 2. Thus, the client terminal 2 stands by and waits for a purchase request for music contents made by the user.

If, on the other hand, the answer to the question in Step SP71 is affirmative, it means that the plug or the network cable is pulled out while the client terminal is executing the acquisition process in response to a purchase request for music contents so that the communication connection to the network 3 is shut off and consequently the acquisition process is interrupted. In other words, the affirmative answer indicates that the acquisition start information temporarily stored as process progress information remains in the hard disk. Therefore, the client terminal 2 resumes the acquisition process and moves to the next step, or Step SP72.

Note that the client terminal 2 temporarily had stored in the hard disk and been using the acquisition/use file 25 acquired from the acquisition/use information providing server 5 when the acquisition process that is resumed was interrupted last time. However, the contents providing address and the attributes file providing address that are contained in the acquisition/use file 25 may have been altered during the interruption of the acquisition process for some reason or another by the organization that is managing and running the contents providing server 6 and the attributes information providing server 7.

Therefore, in Step SP72, the client terminal 2 deletes the acquisition/use file 25 that had been used when the acquisition process was interrupted last time and moves to the next step, or Step SP73.

In Step SP73, the client terminal 2 generates the acquisition/use information request data that contain the accounting ID that had temporarily been stored in the hard disk as process progress information when the acquisition process was interrupted last time, together with the user ID and the password. Then, the client terminal 2 transmits the acquisition/use information request data to the portal server 4 and moves to the next step, or Step SP74.

Then, in Step SP81, the portal server 4 personally authenticates the user according to the acquisition/use information request data transmitted from the client terminal 2. Thereafter, the portal server 4 searches for and finds out the file name of the acquisition/use file 25 that had been provided to the client terminal 2 when the acquisition process was interrupted last time from the user database 13 according to the accounting ID stored in the acquisition/use information request data. Then, the portal server 4 transmits the file name and the accounting ID to the acquisition/use information providing server 5 and requests the acquisition/use file 25.

In Step SP91, the acquisition/use information providing server 5 identifies the acquisition/use file 25 that had been provided to the client terminal 2 when the acquisition process was interrupted last time according to the accounting ID and file name transmitted from the portal server 4 and the information contained in the acquisition/use information database 23. If the contents providing address and the attributes file providing address have been altered, the acquisition/use information providing server 5 updates the contents of the identified acquisition/use file 25 and transmits them to the client terminal 2 by way of the portal server 4. If the contents providing address and the attributes file providing address have not been altered, the acquisition/use information providing server 5 transmits the identified acquisition/use file 25 to the client terminal 2 by way of the portal server 4 without updating them.

Then, in Step SP74, the client terminal 2 receives anew the acquisition/use file 25 transmitted from the acquisition/use information providing server 5 by way of the portal server 4 and temporarily stores it in the hard disk. Thereafter, the client terminal 2 selects a requested contents ID form the acquisition/use file 25 it received anew and moves to the next step, or Step SP75.

In Step SP75, the client terminal 2 determines if the requested contents ID selected from the acquisition/use file 25 is not stored in the hard disk yet as process progress information (that is as in-storage contents ID) or not.

If the answer to the question in Step SP75 is affirmative, it means that the requested contents ID selected in Step SP74 is not temporarily stored in the hard disk as process progress information (that is as in-storage contents ID) yet. In other words, the affirmative answer indicates that the client terminal 2 had not acquired the contents data that correspond to the requested contents ID from the contents providing server 6 when the acquisition process was interrupted last time. Therefore, the client terminal 2 then moves to the next step, or Step SP6.

In Step SP6, the client terminal 2 compares the requested contents ID selected from the acquisition/use file 25 and the contents ID in the acquisition information database. Then, the client terminal 2 determines if the requested contents ID is unregistered in the acquisition information database or not according to the outcome of the comparison.

If the answer to the question in Step SP6 is affirmative, it indicates that the requested contents ID selected from the acquisition/use file 25 is not registered in the acquisition information database yet. In other words, the affirmative answer indicates that the client terminal 2 acquires the contents data that correspond to the requested contents ID for the first time by way of the acquisition process that is resumed now. Therefore, if the answer is affirmative, the client terminal 2 moves to the next step, or Step SP7.

Subsequently, the client terminal 2 sequentially performs the operations of Steps SP7-SP8-SP9-SP10-SP11-SP12-SP13-SP14 as in the case of the acquisition process in the music contents purchase sequence described above by referring to FIGS. 13 and 14. In this way, the client terminal 2 sequentially and alternately acquires the contents data and the contents attributes files 47 that correspond to the pieces of music for which the purchase request is made by the user.

If, on the other hand, the answer to the question in Step SP75 is negative, it means that the requested contents ID selected in Step SP74 is already temporarily stored in the hard disk as process progress information (that is as in-storage contents ID). In other words, the negative answer indicates that the client terminal 2 had already acquired the contents data that correspond to the requested contents ID from the contents providing server 6 when the acquisition process was interrupted last time. Therefore, the client terminal 2 then moves to the next step, or Step SP76.

In Step SP76, the client terminal 2 determines if the file name of the contents attributes file 47 that corresponds to the requested contents ID selected in Step SP74 is not stored in the hard disk yet as process progress information or not.

If the answer to the question in Step SP76 is affirmative, it means that the file name of the contents attributes file 47 that corresponds to the requested contents ID selected in Step SP74 is not temporarily stored in the hard disk as process progress information yet. In other words, the affirmative answer indicates that the client terminal 2 had not acquired the contents attributes file 47 that corresponds to the requested contents ID from the attributes information providing server 7 when the acquisition process was interrupted last time. Therefore, the client terminal 2 then moves to Step SP9. Thus, the client terminal 2 acquires only the contents attributes file 47 that corresponds to the requested contents. ID without acquiring the contents data that correspond to the requested contents ID.

If, on the other hand, the answer to the question in Step SP76 is negative, it means that the file name of the contents attributes file 47 that corresponds to the requested contents ID selected in Step SP74 is already temporarily stored in the hard disk as process progress information. In other words, the negative answer indicates that the client terminal 2 had already acquired the contents attributes file 47 along with the along with the corresponding contents data that corresponds to the requested contents ID when the acquisition process was interrupted last time. Therefore, the client terminal 2 then moves to Step SP77.

In Step SP77, the client terminal 2 determines if the registration information that corresponds to the requested contents ID selected in Step SP74 is unregistered in the acquisition information database in the hard disk yet or not.

If the answer to the question in Step SP77 is affirmative, it means that the client terminal 2 sequentially acquired the contents data and the contents attributes file 47 that correspond to the requested contents ID selected in Step SP74 in the last acquisition process but the acquisition process was interrupted immediately before registering the registration information that corresponds to the requested contents ID selected in Step SP74 in the acquisition information database in the hard disk. Then, the client terminal 2 moves to Step SP11, where the client terminal 2 registers the registration information in the acquisition information database.

If, on the other hand, the answer to the question in Step SP77 is negative, it means that the registration information that corresponds to the requested contents ID selected in Step SP47 had already been registered in the acquisition information database when the acquisition process was interrupted last time. Then, the client terminal 2 moves to Step SP78.

In Step SP78, the client terminal 2 determines if the registration completion information that indicates the completion of the registration of the registration information that corresponds to the requested contents ID selected in Step SP74 is not stored yet as process progress information or not.

If the answer to the question in Step SP78 is affirmative, it means that the acquisition process was interrupted last time immediately before temporarily storing the registration completion information that indicates the completion of the registration of the registration information that corresponds to the requested contents ID selected in Step SP74 in the hard disk as process progress information. Then, the client terminal 2 moves to Step SP12, where the client terminal 2 temporarily stores the registration completion information in the hard disk as process progress information.

If, on the other hand, the answer to the question in Step SP78 is negative, it means that the registration completion information that indicates the completion of the registration of the registration information that corresponds to the requested contents ID selected in Step SP74 had already been temporarily stored in the hard disk as process progress information when the acquisition process was interrupted last time. Then, the client terminal 2 moves to Step SP13, where it determines if there still are contents data and contents attributes files 47 to be acquired or not according to the contents of the updated acquisition/use file 25 newly acquired from the acquisition/use information providing server 5.

In this way, when an acquisition process is resumed after a temporary interruption, the client terminal 2 can avoid acquiring in duplicate the contents data and the contents attributes file 47 that correspond to the piece of music to be purchased before and after the interruption of the acquisition process. Thus, the client terminal 2 can efficiently acquire the contents data and the contents attributes files 47 that correspond to the pieces of music to be purchased.

(3) Backup Control Process Sequence

The backup control process of the contents data and contents attributes file 47 acquired by the client terminal 2 in response to a request for purchasing one or more than one pieces of music made by the user will be described.

(3-1) Backup Process Sequence

Firstly, the client terminal 2 asks the user to select either the contents data or the contents attributes file 47 as backup data to be stored in the initialization stage.

Figure 17:
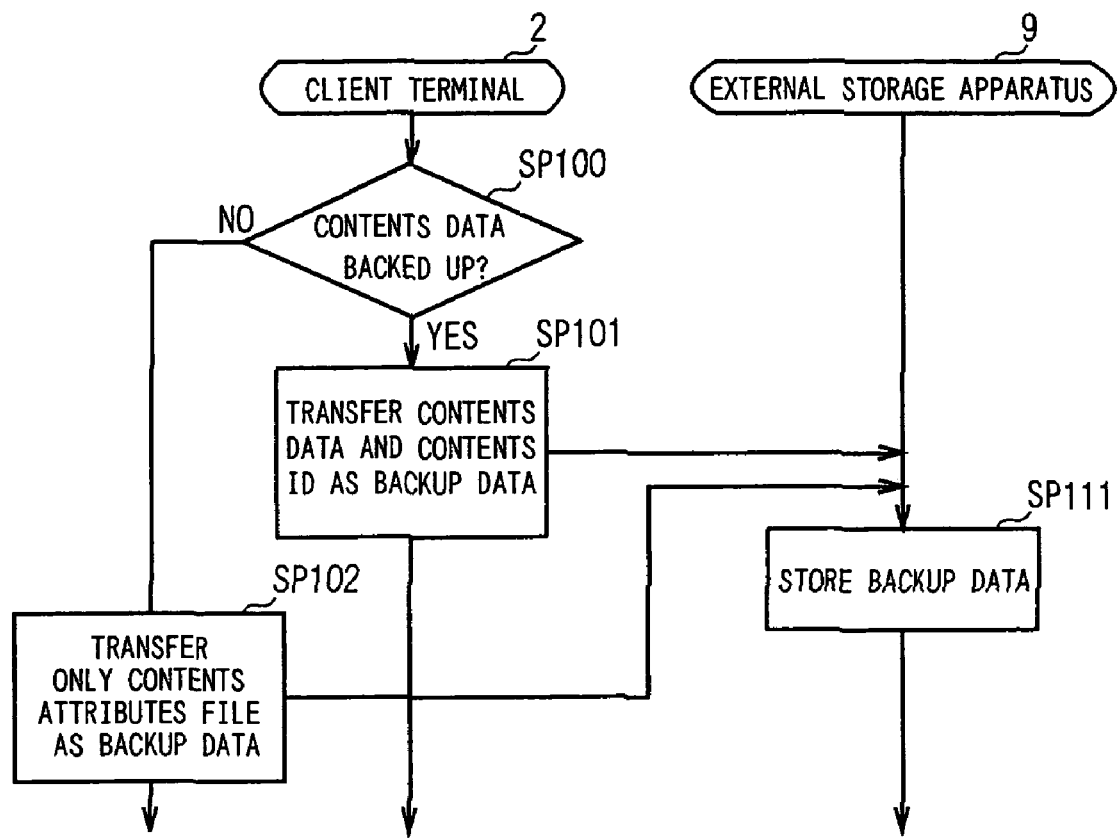
FIG. 17 is a flowchart of the backup control sequence that can be used in a back up storage process.

Then, referring to FIG. 17, as the client terminal 2 detects a request for backup storage made by the user or a backup request at a predetermined timing for periodical back storage operation, it determines if the data are contents data to be backed up or not in Step SP100.

If the answer to the question in Step SP100 is affirmative, it means that the user selects contents data to be stored as backup data in the initialization stage. Therefore, the client terminal 2 then moves to the next step, or Step SP101.

In Step SP101, the client terminal 2 transfers all the contents data and the contents IDs for the contents data that are stored in the hard disk of the hard disk drive 104 to the external storage apparatus 9 as backup data.

If, on the other hand, the answer to the question in Step SP100 is negative, it means that the user selects contents attributes files 47 to be stored as backup data in the initialization stage. Therefore, the client terminal 2 then moves to Step SP102.

In Step SP102, the client terminal 2 transfers only all the contents attributes files 47 stored in the hard disk of the hard disk drive 104 to the external storage apparatus 9 as backup data.

Then, in Step SP111, the external storage apparatus 9 takes in the backup data transferred from the client terminal 2. Thereafter, the external storage apparatus 9 stores the backup data in the backup storage section 64 as backup operation.

Thus, the client terminal 2 transfers the backup data to the external storage apparatus 9 at a predetermined timing that comes with a predetermined cycle period or at a timing arbitrarily selected by the user to execute a backup process. In this way, the client terminal 2 stores the backup data to overwrite the backup data that are stored in the past in the external storage apparatus 9. As described above, the client terminal 2 stores either the contents data or the contents attributes file 47 it acquires for each piece of music for which a purchase request is made by the user.

(3-2) Reacquisition Process Sequence (3-2-1) Reacquisition Process Sequence for Contents Data in Response to the Return of Backup Data Firstly, the reacquisition process of reacquiring the contents data that are not stored in the external storage apparatus 9 as backup data when the client terminal 2 is restored from a failure because the contents data and the contents attributes files 47 that had been acquired when the failure of the client terminal 2 took place were lost will be described below.

Figure 18:
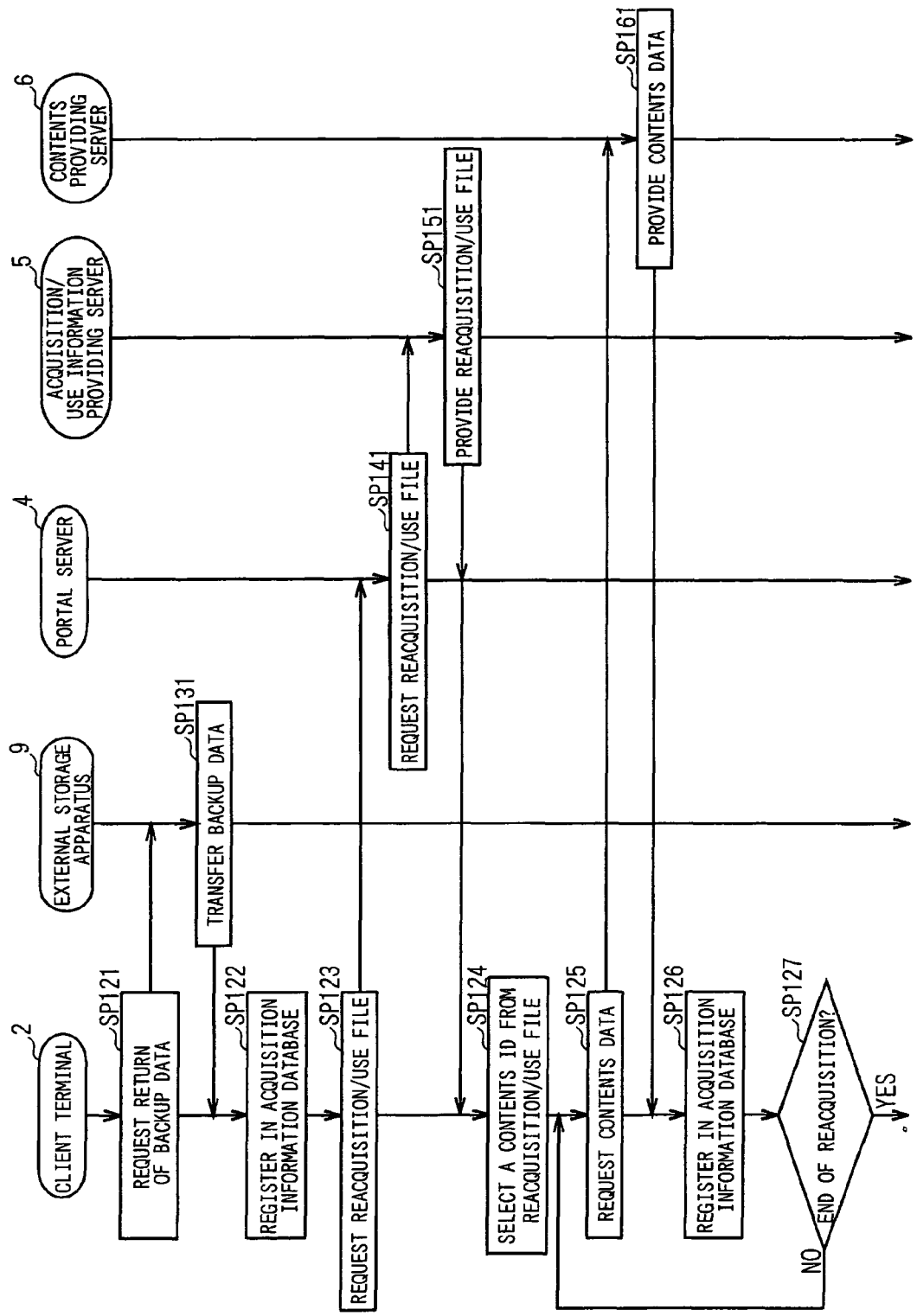
FIG. 18 is a flowchart of the backup control sequence that can be used in a contents data reacquisition process.

As shown in FIG. 18, in Step SP121, the client terminal 2 requests the external storage apparatus 9 to return the backup data of the contents attributes files 47 stored in the external storage apparatus 9 and then moves to the next step, or Step SP122.

Then, in Step SP131, the external storage apparatus 9 reads out the backup data from the backup storage section 64 in response to the return request from the client terminal 2 and transfers them to the client terminal 2.

Then, in Step SP122, the client terminal 2 takes in the backup data of the contents attributes file 47 transferred from the external storage apparatus 9 so as to store all the contents attributes files 47 in the hard disk of the hard disk drive 104. Additionally, the client terminal 2 relates all the contents IDs stored in the contents attributes files 47 (and hence the contents IDs of the contents data that correspond to the contents attributes files 47) to the storage addresses on the hard disk for all the contents attributes files 47 and registers them in the acquisition information database in the hard disk. Subsequently, the client terminal 2 moves to the next step, or Step SP123.

In Step SP123, the client terminal 2 transmits reacquisition/use information request data for reacquiring the contents data that contain the user ID, the password, all the contents IDs of the sets of contents stored respectively in all the contents attributes files 47 (and hence the contents IDs of all the contents data to be reacquired) to the portal server 4 and then moves to the next step, or Step SP124.

Then, in Step SP141, the portal server 4 personally authenticates the user according to the user ID and the password contained in the reacquisition/use information request data transmitted from the client terminal 2. Subsequently, the portal server 4 searches for and finds out the file names of all the acquisition/use files 25 that have been provided to the client terminal 2 by this time from the user database 13. Then, the portal server 4 notifies the acquisition/use information providing server 5 of all the file names that are found out and all the contents IDs contained in the reacquisition/use information request data.

Then, in Step SP151, the acquisition/use information providing server 5 searches for and finds out the corresponding acquisition/use files 25 from the acquisition/use information database 23 according to the file names and the contents IDs notified from the portal server 4. Thereafter, the acquisition/use information providing server 5 generates a reacquisition/use file to the next step, Step SP127.

In Step SP127, the client terminal 2 determines if it has reacquired all the contents data to be reacquired from the contents providing server 6 or not.

If the answer to the question in Step SP127 is negative, it means that the client terminal 2 has not completely reacquired all the contents data that correspond to the contents attributes file 47 returned from the external storage apparatus 9 as backup data. Therefore, the client terminal 2 then returns to Step SP124. Then, the client terminal 2 cyclically repeats the operations of Steps SP124-SP125-SP126-SP127 until the answer to the question in Step SP127 becomes affirmative. In this way, the client terminal 2 sequentially reacquires the contents data that are not stored in the external storage apparatus 9 as backup data.

If, on the other hand, the answer to the question in Step SP127 is affirmative, it means that the client terminal 2 has completely reacquired all the contents data that correspond to the contents attributes files 47 returned from the external storage apparatus 9 as backup data. Therefore, the client terminal 2 then ends the reacquisition process for contents data.

(3-2-2) Reacquisition Process Sequence for Contents Attribute Files 47 in Response to the Return of Backup Data Now, the reacquisition process of reacquiring the contents attributes files 47 that are not stored in the external storage apparatus 9 as backup data when the client terminal 2 is restored from a failure because the contents data and the contents attributes files 47 that had been acquired when the failure of the client terminal 2 took place were lost will be described below.

Figure 19:
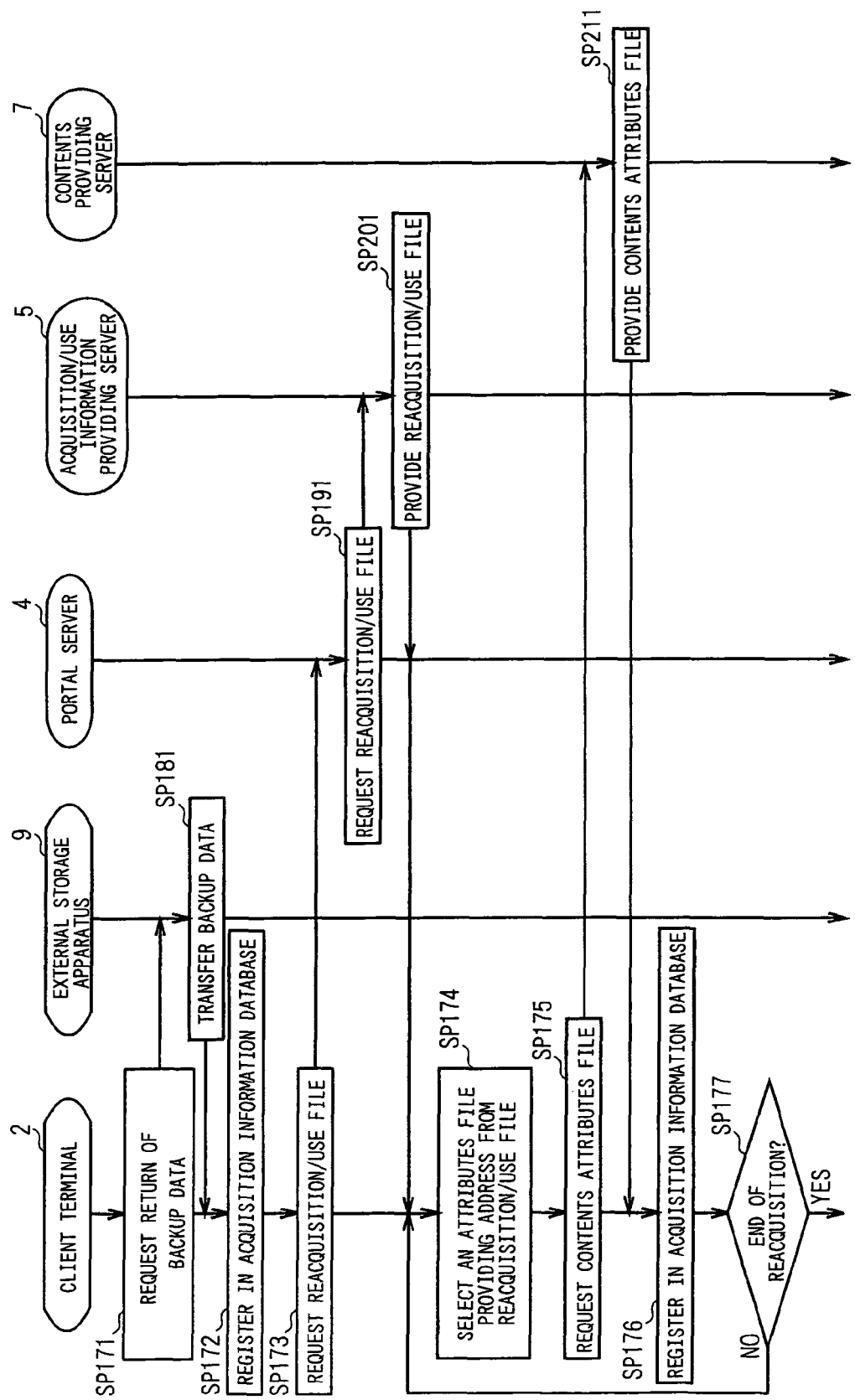
FIG. 19 is a flowchart of the backup control sequence that can be used in a contents attributes file reacquisition process.

As shown in FIG. 19, in Step SP171, the client terminal 2 according to the found out acquisition/use files 25. Then, the acquisition/use information providing server 5 transmits the reacquisition/use file to the client terminal 2 by way of the portal server 4.

In Step SP124, the client terminal 2 selects a contents ID of the contents data it has not acquired from the contents providing server 6 by this time (that is a requested contents ID) from the reacquisition/use file it acquired from the acquisition/use information providing server 5 by way of the portal server 4 and then moves to the next step, or Step SP125.

In Step SP125, the client terminal 2 selects the contents providing address that corresponds to the requested contents ID it selects in Step SP124 from the reacquisition/use file. Then, the client terminal 2 accesses the contents providing home page according to the contents providing address it selects. Under this condition, the client terminal 2 transmits the requested contents ID to the contents providing server 6 as contents request information and then moves to the next step, or Step SP126.

In Step SP161, the contents providing server 6 transmits the contents data that correspond to the requested contents ID transmitted from the client terminal 2 to the client terminal 2.

In Step SP26, the client terminal 2 receives the contents data transmitted from the contents providing server 6 and stores them in the hard disk of the hard disk drive 104. Additionally, the client terminal 2 relates the storage address of the contents data on the hard disk to the storage address of the corresponding requested contents ID and that of the corresponding contents attributes file 47 on the hard disk and registers them in the acquisition information database in the hard disk and then moves requests the external storage apparatus 9 to return the backup data of the contents data and the contents IDs stored in the external storage apparatus 9 and then moves to the next step, or Step SP172.

Then, in Step SP181, the external storage apparatus 9 reads out the backup data from the backup storage section 64 in response to the return request from the client terminal 2 and transfers them to the client terminal 2.

In Step SP172, the client terminal 2 takes in the backup data of the contents data and the contents IDs transferred from the external storage apparatus 9 and stores all the contents data in the hard disk of the hard disk drive 104. Additionally, the client terminal 2 relates all the contents IDs returned to it as backup data to the storage addresses on the hard disk of all the contents data and registers them in the acquisition information database in the hard disk and then moves to the next step, or Step SP173.

In Step SP173, the client terminal 2 transmits reacquisition/use information request data for reacquiring the contents attributes files 47 that contain the user ID, the password and all the contents IDs returned from the external storage apparatus 9 to the portal server 4 and then moves to the next step, or Step SP174.

Then, in Step SP191, the portal server 4 personally authenticates the user according to the user ID and the password contained in the reacquisition/use information request data transmitted from the client terminal 2. Subsequently, the portal server 4 searches for and finds out the file names of all the acquisition/use files 25 that have been provided to the client terminal 2 by this time from the user database 13. Then, the portal server 4 notifies the acquisition/use information providing server 5 of all the file names that are found out and all the contents IDS contained in the reacquisition/use information request data.

Then, in Step SP201, the acquisition/use information providing server 5 searches for and finds out the corresponding acquisition/use files 25 from the acquisition/use information database 23 according to the file names and the contents IDs transmitted from the portal server 4. Thereafter, the acquisition/use information providing server 5 generates a reacquisition/use file according to the found out acquisition/use files 25. Then, the acquisition/use information providing server 5 transmits the reacquisition/use file to the client terminal 2 by way of the portal server 4.

In Step SP174, the client terminal 2 selects as attributes request information an attribute file providing address for providing a contents attributes file 47 that has not been provided by the attributes information providing server 7 by this time from the reacquisition/use file acquired from the acquisition/use information providing server 5 by way of the portal server 4 and then moves to the next step, or Step SP175.

In Step SP175, the client terminal 2 accesses the attributes file providing home page of the attributes information providing server 7 according to the attributes file providing address it selects in Step SP174 from the reacquisition/use file and moves to the next step, or Step SP176.

In Step S211, the attributes information providing server 7 transmits the contents attributes file 47 that corresponds to the attributes file providing home page accessed by the client terminal 2 to the client terminal 2.

In Step SP176, the client terminal 2 takes in the contents attributes file 47 provided from the attributes information providing server 7 and stores it in the hard disk of the hard disk drive 104. Additionally, the client terminal 2 relates the storage address of the contents attributes file 47 on the hard disk to the storage address of the corresponding ID and that of the corresponding contents data on the hard disk and registers them in the acquisition information database in the hard disk. Then, the client terminal 2 moves to the next step, or Step SP177.

In Step SP177, the client terminal 2 determines if it has reacquired all the contents attributes files 47 to be reacquired from the attributes information providing server 7 or not.

If the answer to the question in Step SP177 is negative, it means that the client terminal 2 has not completely reacquired all the contents attributes files 47 that correspond to the contents data returned from the external storage apparatus 9 as backup data. Therefore, the client terminal 2 then returns to Step SP174. Then, the client terminal 2 cyclically repeats the operations of Steps SP174-SP175-SP176-SP177 until the answer to the question in Step SP177 becomes affirmative. In this way, the client terminal 2 sequentially reacquires the contents attributes files 47 that are not stored in the external storage apparatus 9 as backup data.

If, on the other hand, the answer to the question in Step SP177 is affirmative, it means that the client terminal 2 has completely reacquired all the contents attributes files 47 that correspond to the contents data and the contents IDs returned from the external storage apparatus 9 as backup data. Therefore, the client terminal 2 then ends the reacquisition process for contents attributes files 47.

When the client terminal 2 reacquires contents data and contents attributes files 47 in a state where the hard disk drive 104 is replaced by a storage medium that may be a hard disk drive, a semiconductor memory or a magneto-optical disk due to the failure of the client terminal 2, it stores the contents data and the contents attributes files 47 it reacquires in the new storage medium and rebuilds the acquisition information database in the storage medium.

(4) Operations and Advantages

When the user requests to purchase one or more than one pieces of music with the above-described arrangement, the client terminal 2 of the data delivery system 1 acquires the acquisition/use file 25 to be used for the acquisition process to be executed in response to the purchase request from the acquisition/use information providing server 5 and temporarily stores it in the hard disk. Under this condition, the client terminal 2 determines if the single requested contents ID selected from the acquisition/use file 25 is already registered in the acquisition information database or not.

If, as a result, it is determined that the requested contents ID is not registered in the acquisition information database yet, it means that the client terminal 2 has never acquired the contents data that correspond to the requested contents ID in the past. Therefore, the client terminal 2 then makes a request for acquiring the contents data that correspond to the requested contents ID to the contents providing server 6 and receives the contents data from the latter. Thereafter, the client terminal 2 makes a request for acquiring the contents attributes file 47 that correspond to the requested contents ID to the attributes information providing server 7 and receives the contents attributes file 47 from the latter.

If, on the other hand, it is determined that the requested contents ID is already registered in the acquisition information database, it means that the client terminal 2 has already acquired the contents data that correspond to the requested contents ID before the current acquisition process and stored them in the hard disk. Therefore, the client terminal 2 then withdraws the request for the contents data that correspond to the requested contents ID that is made to the contents providing server 6 and only requests the attributes information providing server 7 to provide the contents attributes file 47 that corresponds to the requested contents ID and receives it so as to avoid acquiring the contents data in duplicate.

Thus, when the user makes a request for purchasing a piece of music and the contents data of the requested piece of music have already been acquired before the current request, the client terminal 2 acquires only the contents attributes file 47 that corresponds to the contents data to avoid acquiring the contents data in duplicate and consequently remarkably reduce the time necessary for the acquisition process.

Additionally, the client terminal 2 temporarily stores acquisition start information when it starts an acquisition process in response to the request for purchasing a piece of music made by the user and also temporarily stores the contents ID of the contents data as in-storage contents ID when it receives the contents data and stores them in the hard disk. In this way, the client terminal 2 leaves process progress information that tells the extent to which the acquisition process has proceeded. With this arrangement, if the ongoing acquisition process is interrupted because the power supply is broken off or for some other reason, the client terminal 2 can determine if the process progress information is left or not and hence if the acquisition start information is left as the process progress information or not and resume the acquisition process if the acquisition start information is temporarily stored and left when the client terminal 2 recovers the state where it can communicates with various servers.

Then, after resuming the acquisition process, the client terminal 2 can accurately determine the extent to which the acquisition process had proceeded when it was interrupted on the basis of the process progress information. Thus, the client terminal 2 will acquire the contents data after the resumption of the acquisition process if it had not acquired them or alternately it will only acquire the contents attributes file 47 without requesting the contents providing server 6 to provide the contents data once again if it has already acquired the contents data according to the outcome of the determination. In this way, the client terminal 2 can effectively avoid executing the acquisition process twice before and after the interruption so that it can execute the acquisition process for purchasing the piece of music in a time period (contents acquisition time) substantially same as the time period that is spent when the acquisition process is executed without interruption.

With the above-described arrangement, when the client terminal 2 executes an acquisition process in response to a request made by the user to purchase a piece of music and selects the requested contents ID for requesting the contents providing server 6 to provide the contents data of the piece of music, it determines if the contents data that correspond to the requested contents ID have already been stored in the hard disk before the current request or not. Then, if the contents data that correspond to the requested contents ID have not been stored in the hard disk, the client terminal 2 receives the contents data from the contents providing server 6 to store them in the hard disk and subsequently it receives the contents attributes file 47 that corresponds to the contents data from the attributes information providing server 7 and also stores it in the hard disk. If, on the other hand, the contents data that correspond to the requested contents ID have already been stored in the hard disk, the client terminal 2 withdraws the request made to the contents providing server 6 for the contents data and receives only the contents attributes file 47 that corresponds to the contents data from the attributes information providing server 7 and stores it in the hard disk. With this arrangement, the client terminal 2 can effectively avoid acquiring contents data in duplicate when it has already acquired the contents data before the current request for the contents data to consequently and remarkably reduce the time that has to be spent for the acquisition process. In this way, it is possible to realize a data delivery system 1 that can remarkably improve the efficiency of acquisition process.

Additionally, when the client terminal 2 executes an acquisition process in response to a purchase request made by the user for purchasing a piece of music, it appropriately leaves process progress information that indicates the extent to which the acquisition process has proceeded so that, if the acquisition process is interrupted and resumed thereafter, it can resume the acquisition process so as to acquire the contents data or, if the contents data have already been acquired, only to acquire the contents attributes file 47 without requesting the contents providing server 6 to provide the contents data once again. Thus, in the data delivery system 1, the client terminal 2 can reliably avoid executing the acquisition process twice before and after the interruption of the acquisition process so that, when the acquisition process is interrupted and resumed, it can execute the acquisition process for purchasing the piece of music in a time period substantially same as the time period that is spent when the acquisition process is executed without interruption and hence prevent the efficiency of executing the acquisition process from undesirably falling.

Additionally, in the data delivery system 1, when the client terminal 2 resumes the acquisition process that is interrupted once, it reacquires the acquisition/use file 25 from the acquisition/use information providing server 5 to use it for the resumed acquisition process. Thus, in the data delivery system 1, the client terminal 2 can reliably prevent a situation where the accounting process has already been executed for the user at the time of the interruption of the purchase request but the contents providing address and/or the attributes file providing address have been altered and hence are different before the interruption of the acquisition process and after the resumption thereof so that it is no longer possible to acquire the contents data and/or the contents attributes file 47. Then, it is possible to have the user accurately purchase all the pieces of music who has made a request for purchasing those pieces of music.

(5) Other Embodiments

While the client terminal 2 is adapted to acquire contents data and a contents attributes file 47 in response to a purchase request made by the user to purchase a piece of music in the above-described embodiment, the present invention is by no means limited thereto. Alternatively, it may be so arranged that the client terminal 2 is provided with a storage medium such as a CD (compact disk) that stores in advance contents data that the user is not authorized to reproduce and the contents IDs of the contents data are registered in an acquisition information database so that, when a request is made to reproduce a set of contents data from the storage medium, only the contents attributes information that corresponds to the contents data to be reproduced is acquired by following the acquisition process sequence described above by referring to FIGS. 13 through 16. With this alternative arrangement, it is possible to have the user listen to the piece of music of the contents data without storing the contents data that the user is not authorized to reproduce in the hard disk.

Additionally, the client terminal 2 may be provided with a storage medium such as a CD that stores in advance contents data for which a limited authorized reproduction period is defined for audition and the contents IDs of the contents data may be registered in an acquisition information database. With this alternatively arrangement, if the user likes a piece of music as he or she auditioned it in the limited authorized reproduction period, the client terminal 2 acquires only the contents attributes information that corresponds to the contents data by following the acquisition process sequence described above by referring to FIGS. 13 through 16 and prolongs the authorized reproduction period or increases the number of times of authorized reproductions. With this alternative arrangement, it is possible to have the user listen to the piece of music of the contents data for which the authorized reproduction period is limited without storing the contents data in the hard disk.

Still additionally, it may alternatively be so arranged that the client terminal 2 acquires contents attributes information for increasing the number of times of checkouts by following the acquisition process sequence described above by referring FIGS. 13 through 16 for the contents data it acquired in the form of a storage medium such as a CD or by way of the delivery system using the network 3 so as to consequently increase the number of times of checkouts for the contents data.

While the contents providing server 6 and the attributes information providing server 7 respectively open a contents providing home page and an attributes file providing home page for the purpose of providing contents data and contents attributes files 47 in the above-described embodiment, the present invention is by no means limited thereto. Alternatively, contents data and contents attributes files 47 can be provided to the client terminal 2 when it is so arranged that the contents providing server 6 provides an address to be accessed by the client terminal 2 for the purpose of acquiring contents data without opening a contents providing home page for providing contents data and the attributes information providing server 7 provides an address to be accessed by the client terminal 2 for the purpose of acquiring contents attributes files 47 without opening an attributes file providing home page for providing contents attributes files 47.

Still additionally, while a contents acquisition apparatus according to the present invention is applied to the client terminal 2 of the embodiment described above by referring to FIGS. 1 through 19, the present invention is by no means limited thereto and a contents acquisition apparatus according to the present invention can find many other applications including information processing apparatus such as personal computers, portable telephones and PDAs (Personal Digital Assistances) and players such as CD players and DVD (Digital Versatile Disc) players as long as they can acquire contents attributes information that corresponds to contents data.

Namely, while the client terminal 2 is provided with hardware circuit blocks and program modules in the above-described embodiment, any of various different terminals including portable telephones and personal computers can be used to execute processes like the client terminal 2 so long as it is provided with such hardware circuit blocks and program modules.

Still additionally, an attributes information providing apparatus according to the present invention is applied to an attributes information providing server 7 that includes a computer in the embodiment described above by referring to FIGS. 1 through 9, the present invention is by no means limited thereto and an attribute information providing apparatus according to the present invention can find many other applications including information processing apparatus such as personal computers, portable telephones and PDAs as long as they can provide contents attributes information that corresponds to contents data.

Still additionally, while a contents acquisition program according to the invention is applied to a group of modules stored in advance in the ROM 102 of the client terminal 2 and including the HTTP message program 130, the communicator program 131, the copy right protection/management module 133, the music purchase/reproduction module 135, the XML browser 136, the hard disk contents controller 137, the database access module 139 and the contents data access module 140 and the CPU 100 of the client terminal 2 executes acquisition processes by following the above-described music contents purchase sequence by referring to FIGS. 13 through 16 in the above-described embodiment, the present invention is by no means limited thereto. For instance, any of other contents acquisition programs having different configurations may alternatively be applied and a program storage medium storing such a contents acquisition program may be installed in the client terminal 2 so as to execute acquisition processes.

Still additionally, while an attributes information providing program according to the invention is applied to the attributes information providing program that is stored in advance in the ROM 41 of the attributes information providing server 7 and the control section 40 of the attributes information providing server 7 executes an attributes information providing process, following the music contents purchase sequence described above by referring to FIGS. 13 through 16 (Step SP61 through Step SP63), according to the attributes information providing program, the present invention is by no means limited thereto. For example, any of various different attributes information providing programs may be used for the purpose of the present invention and such an attributes information providing process may be executed by installing a program storage medium that stores the attributes information providing program in the attributes information providing server 7.

While the contents data stored in an external apparatus are those of pieces of music in the above embodiment that is described by referring to FIGS. 1 through 19, the present invention is by no means limited thereto and various other contents data such as video data of photographs and movies, program data for games and contents data broadcast by satellite broadcasting may also be applicable to the present invention.

While the CPU 100, the communication processing section 114 and the network interface 115 of the client terminal 2 are adapted to operate as file request information transmission means for transmitting file request information requesting acquisition/use file including the contents providing address and the attributes information providing address in response to an acquisition request for acquiring any of the contents data stored in an external storage apparatus in the embodiment described above by referring to FIGS. 1 through 19, the present invention is by no means limited thereto and any of various different file request information transmission means such as a file request information transmission circuit that is a hardware circuit transmitting file request information or a wireless communication interface that is also a hardware circuit may alternatively be used for the purpose of the present invention.

While the CPU 100, the communication processing section 114 and the network interface 115 of the client terminal 2 are adapted to operate as file reception means for receiving acquisition/use files in response to file request information transmitted from the file request information transmission means in the embodiment described above by referring to FIGS. 1 through 19, the present invention is by no means limited thereto and any of various different file reception means such as a file reception circuit that is a hardware circuit receiving an acquisition/use file or a wireless communication interface that is also a hardware circuit may alternatively be used for the purpose of the present invention.

While the hard disk drive 104 of the client terminal 2 is adapted to operate as temporary file storage means for temporarily storing the acquisition/use files received by the file reception means in the embodiment described above by referring to FIGS. 1 through 19, the present invention is by no means limited thereto and any of various different temporary storage means for temporarily storing acquisition/use files such as a file temporary storage circuit that is a hardware circuit, which may typically a storage medium such as a magneto-optical disk or a semiconductor memory, may alternatively be used for the purpose of the present invention.

While the CPU 100 of the client terminal 2 is adapted to operate as a determination means for determining if the contents identification information that corresponds to the contents providing address in an acquisition/use file is registered in the corresponding database or not in the embodiment described above by referring to FIGS. 1 through 19, the present invention is by no means limited thereto and any of various different determination means for determining if the contents identification information that corresponds to the contents providing address in a acquisition/use file is registered in the corresponding database or not such as a determination circuit that is a hardware circuit may alternatively be used for the purpose of the present invention.

While the CPU 100, the communication processing section 114 and the network interface 115 of the client terminal 2 are adapted to operate as contents request information transmission means for transmitting contents request information to an external apparatus, requesting the contents data that correspond to given contents identification information, when it is determined by the determination means that the contents identification information is not registered in the corresponding database in the embodiment described above by referring to FIGS. 1 through 19, the present invention is by no means limited thereto and any of various different contents request information transmission means for transmitting contents request information such as a contents request information transmission circuit that is a hardware circuit or a wireless communication interface that is also a hardware circuit may alternatively be used for the purpose of the present invention.

While the CPU 100, the communication processing section 114 and the network interface 115 of the client terminal 2 are adapted to operate as data reception means for receiving contents data transmitted from an external apparatus as a result of transmitting contents request information to the external apparatus by means of the contents request information transmission means in the embodiment described above by referring to FIGS. 1 through 19, the present invention is by no means limited thereto and any of various different data reception means for receiving contents data such as a data reception circuit that is a hardware circuit or a wireless communication interface that is also a hardware circuit may alternatively be used for the purpose of the present invention.

While the CPU 100 and the hard disk drive 104 of the client terminal 2 are adapted to operate as contents identification information temporary storage means for temporarily storing contents identification information as in-storage contents identification information when it is determined by the determination means that the contents identification information is already registered in a corresponding database or the reception of the corresponding contents data by the data reception means is completed in the embodiment described above by referring to FIGS. 1 through 19, the present invention is by no means limited thereto and any of various different contents identification information temporary storage means for temporarily storing contents identification information as in-storage contents identification information such as a contents identification information temporary storage circuit that is a hardware circuit, which may typically a storage medium such as a magneto-optical disk or a semiconductor memory, may alternatively be used for the purpose of the present invention.

While the CPU 100, the communication processing section 114 and the network interface 115 of the client terminal 2 are adapted to operate as attributes request information transmission means for transmitting attributes request information requesting contents attributes information for altering the attributes of the contents data that correspond to in-storage contents identification information when the operation of the contents identification information temporary storage means of temporarily storing the in-storage contents identification information is completed to the attributes information providing address in an acquisition/use file in the embodiment described above by referring to FIGS. 1 through 19, the present invention is by no means limited thereto and any of various different attributes request information transmission means for transmitting attributes request information to the attributes information providing address in an acquisition/use file such as an attributes request information transmission circuit that is a hardware circuit or a wireless communication interface that is also a hardware circuit may alternatively be used for the purpose of the present invention.

While the CPU 100, the communication processing section 114 and the network interface 115 of the client terminal 2 are adapted to operate as attributes information reception means for receiving contents attributes information that correspond to the attributes request information transmitted by means of the attributes request information transmission means in the embodiment described above by referring to FIGS. 1 through 19, the present invention is by no means limited thereto and any of various different attributes information reception means for receiving contents attributes information such as an attributes information reception circuit that is a hardware circuit or a wireless communication interface that is also a hardware circuit may alternatively be used for the purpose of the present invention.

While the CPU 100 and the hard disk drive 104 of the client terminal 2 are adapted to operate as contents attributes identification information temporary storage means for temporarily storing the contents attributes identification information that corresponds to given contents attributes information after the operation of the attributes information reception means of receiving the contents attributes information in the embodiment described above by referring to FIGS. 1 through 19, the present invention is by no means limited thereto and any of various different contents attributes identification information temporary storage means for temporarily storing contents attributes identification information such as a contents attributes identification information temporary storage circuit that is a hardware circuit, which may typically a storage medium such as a magneto-optical disk or a semiconductor memory, may alternatively be used for the purpose of the present invention.

While the CPU 100 and the hard disk drive 104 of the client terminal 2 are adapted to operate as registration means for registering contents data and contents attributes information in a database in the embodiment described above by referring to FIGS. 1 through 19, the present invention is by no means limited thereto and any of various different registration means for registering contents data and contents attributes information in a database built in a storage medium such as a magneto-optical disk or a semiconductor memory such as a registration circuit that is a hardware circuit may alternatively be used for the purpose of the present invention.

While the CPU 100 and the hard disk drive 104 of the client terminal 2 are adapted to operate as temporarily stored information erasure means for erasing the temporarily stored information in a database after the completion of registration of contents data and contents attributes information in the database in the embodiment described above by referring to FIGS. 1 through 19, the present invention is by no means limited thereto and any of various different temporarily stored information erasure means for erasing the temporarily stored information after the completion of registration of contents data and contents attributes information in a database such as a temporarily stored information erasure circuit that is a hardware circuit may alternatively be used for the purpose of the present invention.

While the control section 40 and the data communication processing section 44 of the attributes information providing server 7 are adapted to operate as attributes request information reception means for receiving attributes request information requesting contents attributes information, which corresponds to a contents providing address, for altering the attributes of the contents data that correspond to given in-storage contents identification information transmitted in a state of being temporarily stored as in-storage contents identification information when the contents data are already registered in a database after the acquisition/use file containing the contents providing address and the attributes information providing address that correspond to the acquisition request made to an external apparatus for the contents data are temporarily stored and before the contents data that correspond to the contents providing address are requested or when the reception of the contents data that correspond to the contents providing address in the acquisition request file transmitted from an external apparatus is completed in the embodiment described above by referring to FIGS. 1 through 19, the present invention is by no means limited thereto and any of various different attributes request information reception means for receiving attributes request information such as an attributes request information reception circuit that is a hardware circuit or a wireless communication interface that is also a hardware circuit may alternatively be used for the purpose of the present invention.

While the control section 40 and data communication processing section 44 of the attributes information providing server 7 are adapted to operate as attributes information transmission means for externally transmitting contents attributes information of the contents data that corresponds to given in-storage contents identification information in response to the attributes request information received by the attributes request information reception means in the embodiment described above by referring to FIGS. 1 through 19, the present invention is by no means limited thereto and any of various different attributes information transmission means for externally transmitting contents attributes information such as an attributes information transmission circuit that is a hardware circuit or a wireless communication interface that is also a hardware circuit may alternatively be used for the purpose of the present invention.

INDUSTRIAL APPLICABILITY

The present invention can be used for data delivery systems formed by personal computers, an attributes information providing server and other servers that are connected by way of the Internet or a wireless LAN (Local Area Network).

The invention claimed is:

1. A contents acquisition method comprising:
transmitting file request information that requests an acquisition/use file including a contents providing address corresponding to a request for acquiring contents data stored in an external apparatus and an attributes information providing address, separate from the contents providing address;
receiving the acquisition/use file corresponding to the file request information;
temporarily storing the acquisition/use file received;
determining whether contents identification information corresponding to the contents providing address in the acquisition/use file is registered in a database;
transmitting contents request information for requesting the contents data corresponding to the contents identification information to the external apparatus when it is determined that the contents identification information is not registered in the database;
receiving the contents data transmitted from the external apparatus as a result of transmitting the contents request information to the external apparatus;
temporarily storing the contents identification information as in-storage contents identification information when it is determined that the contents identification information is registered in the database or when the reception of the contents data is completed;
transmitting attributes request information for requesting contents attributes information for altering the attributes of the contents data corresponding to the in-storage contents identification information to the attributes information providing address in the acquisition/use file when the temporary storage of the in-storage contents identification information is completed;
receiving the contents attributes information corresponding to the attributes request information;
temporarily storing the contents attributes identification information corresponding to the contents attributes information after the completion of the reception of the contents attributes information;
registering the contents data and the contents attributes information in the database;
deleting the temporarily stored information after the completion of the registration of the contents data and the contents attributes information in the database; and
controlling reproduction of the contents data based on reproduction criteria included in the contents attributes information, wherein
the file request information includes contents data identification information, and
the acquisition/use file includes the attributes information providing address correlated with the contents data identification information.

2. The method according to claim 1, wherein the contents attributes information includes right of use information that makes the contents data usable.

3. The method according to claim 2, wherein the contents attributes information includes right of use information that makes the contents data reproducible.

4. The method according to claim 1, wherein the contents attributes information includes right of use information for increasing the number of times of copying the contents data stored in the storage medium to other storage mediums.

5. The method according to claim 1, further comprising:
temporarily storing acquisition start information for starting acquisition of the contents data before the transmitting of the file request information.

6. The method according to claim 5, further comprising:
determining whether the acquisition start information is temporarily stored when a communicable state is restored from a break of the communication connection with the external apparatus;
determining whether the in-storage contents identification information is temporarily stored when it is determined that the acquisition start information is temporarily stored; and
transmitting the attribute request information reacquiring the contents attributes information for altering the attributes of the contents data that correspond to the in-storage contents identification information to the attributes information providing address when it is determined that the in-storage contents identification information is temporarily stored.

7. The method according to claim 1, further comprising:
deleting the acquisition/use file when the communicable state is restored from a break of the communication connection with the external apparatus;
transmitting a file re-request information requesting the updated acquisition/use file;
receiving the updated acquisition/use file corresponding to the file re-request information;
temporarily storing the received updated acquisition/use file; and
determining whether the contents identification information corresponding to the contents providing address in the updated acquisition/use file is temporarily stored, wherein
the transmitting contents request information is adapted to transmit the contents request information requesting the contents data corresponding to the contents identification information to the external apparatus when it is determined that the contents identification information is not temporarily stored.

8. The method according to claim 7, further comprising:
determining whether the contents attributes identification information corresponding to the contents identification information is temporarily stored when it is determined that the contents identification information is temporarily stored, wherein
the transmitting attributes request information is adapted to transmit the attributes request information requesting the contents attributes information corresponding to the contents attributes identification information to the attributes information providing address included in the updated acquisition/use file when it is determined that the contents attributes identification information is not temporarily stored.

9. The method according to claim 8, further comprising:
determining whether the contents attributes information corresponding to the contents attribute identification information and the contents data corresponding to the contents attributes information are registered in the database when it is determined that the contents attributes identification information is temporarily stored, wherein
the registering is adapted to register the contents data and the contents attributes information when it is determined that the contents data and the contents attributes information are not registered in the database.

10. The contents acquisition method according to claim 1, wherein the controlling reproduction of the contents data comprises:
restricting reproduction of the contents data to a number of times a user is authorized to reproduce the contents data.

11. An attributes information providing method comprising:
receiving, at the attributes information providing address in the acquisition/use file, attributes request information requesting contents attributes information for altering the attributes of the contents data corresponding to the in-storage contents identification information transmitted in a condition where the contents identification information corresponding to the contents providing address is temporarily stored as in-storage contents identification information;
externally transmitting the contents attributes information of the contents data corresponding to the in-storage contents identification information in response to the attributes request information having been received; and
controlling reproduction of the contents data based on reproduction criteria included in the contents attributes information, wherein
the acquisition request for contents data includes contents data identification information,
the acquisition/use file includes the attributes information providing address correlated with the contents data identification information, and
the method is performed when contents data are already registered in a database or the reception of the contents data corresponding to the contents providing address in the acquisition request file transmitted from an external apparatus is completed after externally and temporarily storing an acquisition/use file including a contents providing address corresponding to the acquisition request for contents data to an external apparatus and an attributes information providing address, separate from the contents providing address, and before requesting the contents data corresponding to the contents providing address, the method.

12. The method according to claim 11, wherein the contents attributes information includes right of use information that makes the contents data usable.

13. The method according to claim 12, wherein the contents attributes information includes the right of use information that makes the contents data reproducible.

14. The method according to claim 11, wherein the contents attributes information includes right of use information for increasing the number of times of copying the contents data stored in the storage medium to other storage mediums.

15. The method according to claim 11, further comprising:
receiving the attributes request information transmitted when the acquisition start information is temporarily stored and the in-storage contents identification information of the contents data is temporarily stored at the time when the communicable state is restored from a break of the communication connection although the acquisition start information indicating the start of acquisition of the contents data to the external apparatus is temporarily stored and the contents data and the contents attributes information corresponding to the contents data are registered in the database before temporarily storing the acquisition/use file but subsequently the acquisition start information and the in-storage contents identification information that are temporarily stored are erased.

16. The attributes information providing method according to claim 11, wherein the controlling reproduction of the contents data comprises:
restricting reproduction of the contents data to a number of times a user is authorized to reproduce the contents data.

17. A contents acquisition apparatus comprising:
a file request information transmission section configured to transmit file request information that requests an acquisition/use file including a contents providing address corresponding to a request for acquiring contents data stored in an external apparatus and an attributes information providing address, separate from the contents providing address;
a file reception section configured to receive the acquisition/use file corresponding to the file request information transmitted by the file request information transmission section;
a temporary storage section configured to temporarily store the acquisition/use file received by the file reception section;
a determination section configured to determine whether the contents identification information corresponding to the contents providing address in the acquisition/use file is registered in a database;
a contents request information transmission section configured to transmit contents request information for requesting the contents data corresponding to the contents identification information to the external apparatus when it is determined by the determination section that the contents identification information is not registered in the database;
a data reception section configured to receive the contents data transmitted from the external apparatus as a result of transmitting the contents request information to the external apparatus by the contents request information transmission section;
a contents identification information temporary storage section configured to temporarily store the contents identification information as in-storage contents identification information when it is determined by the determination section that the contents identification information is registered in the database or when the reception of the contents data is completed by the data reception section;
an attributes request information transmission section configured to transmit attributes request information for requesting contents attributes information for altering the attributes of the contents data corresponding to the in-storage contents identification information to the attributes information providing address in the acquisition/use file when the temporary storage of the in-storage contents identification information by the contents identification information temporary storage section is completed;
an attributes information reception section configured to receive the contents attributes information corresponding to the attributes request information transmitted by the attributes request information transmission section;
a contents attributes identification information temporary storage section configured to temporarily store the contents attributes identification information corresponding to the contents attributes information after the completion of the reception of the contents attributes information by the attributes information reception section;

a registration section configured to register the contents data and the contents attributes information in the database;

a temporarily stored information deletion section configured to delete the temporarily stored information after the completion of the registration of the contents data and the contents attributes information in the database; and a control section configured to control the reproduction of the contents data based on reproduction criteria included in the contents attributes information, wherein the file request information includes contents data identification information, and the acquisition/use file includes the attributes information providing address correlated with the contents data identification information.

18. The contents acquisition apparatus according to claim 17, wherein the control section is configured to restrict the reproduction of the contents data to a number of times that a user is authorized to reproduce the contents data.

19. An attributes information providing apparatus comprising:

an attributes request information reception section configured to receive, at the attributes information providing address in the acquisition/use file, attributes request information requesting contents attributes information for altering the attributes of contents data corresponding to the in-storage contents identification information transmitted in a condition where the contents identification information corresponding to the contents providing address is temporarily stored as in-storage contents identification information;

an attributes information transmission section configured to externally transmit the contents attributes information of the contents data corresponding to the in-storage contents identification information in response to the attributes request information received by the attributes request information reception section; and a control section configured to control the reproduction of the contents data based on reproduction criteria included in the contents attributes information, wherein the acquisition request for contents data includes contents data identification information, the acquisition/use file includes the attributes information providing address correlated with the contents data identification information, and contents data are already registered in a database or the reception of the contents data corresponding to the contents providing address in the acquisition request file transmitted from an external apparatus is completed after externally and temporarily storing an acquisition/use file including the contents providing address corresponding to the acquisition request for contents data to an external apparatus and an attributes information providing address, separate from the contents providing address, and before requesting the contents data corresponding to the contents providing address.

20. The attributes information providing apparatus according to claim 19, wherein the control section is configured to restrict the reproduction of the contents data to a number of times that a user is authorized to reproduce the contents data.

21. A computer-readable medium storing a contents acquisition program for causing an information processing apparatus to execute the steps comprising:

transmitting file request information that requests an acquisition/use file including a contents providing address corresponding to a request for acquiring contents data stored in an external apparatus and an attributes information providing address, separate from the contents providing address;

receiving the acquisition/use file corresponding to the file request information;

temporarily storing the acquisition/use file received;

determining whether the contents identification information corresponding to the contents providing address in the acquisition/use file is registered in a database;

transmitting contents request information for requesting the contents data corresponding to the contents identification information to the external apparatus when it is determined that the contents identification information is not registered in the database;

receiving the contents data transmitted from the external apparatus as a result of transmitting the contents request information to the external apparatus;

temporarily storing the contents identification information as in-storage contents identification information when it is determined that the contents identification information is registered in the database or when the reception of the contents data is completed;

transmitting attributes request information for requesting contents attributes information for altering the attributes of the contents data corresponding to the in-storage contents identification information to the attributes information providing address in the acquisition/use file when the temporary storage of the in-storage contents identification information is completed;

receiving the contents attributes information corresponding to the attributes request information;

temporarily storing the contents attributes identification information corresponding to the contents attributes information after the completion of the reception of the contents attributes information;

registering the contents data and the contents attributes information in the database;

deleting the temporarily stored information after the completion of the registration of the contents data and the contents attributes information in the database; and controlling reproduction of the contents data based on reproduction criteria included in the contents attributes information, wherein the file request information includes contents data identification information, and the acquisition/use file includes the attributes information providing address correlated with the contents data identification information.

22. The computer-readable medium according to claim 21, wherein the controlling reproduction of the contents data comprises:

restricting reproduction of the contents data to a number of times a user is authorized to reproduce the contents data.

23. A computer-readable medium storing an attributes information providing program to be executed by an information processing apparatus, which when executed by the information processing apparatus, causes the information processing apparatus to perform steps comprising:

receiving, at the attributes information providing address in the acquisition/use file, attributes request information requesting contents attributes information for altering the attributes of the contents data corresponding to the in-storage contents identification information transmitted in a condition where the contents identification information corresponding to the contents providing address is temporarily stored as in-storage contents identification information; and externally transmitting the contents attributes information of the contents data corresponding to the in-storage contents identification information in response to the attributes request information having been received; and controlling reproduction of the contents data based on reproduction criteria included in the contents attributes information, wherein the acquisition request for contents data includes contents data identification information, the acquisition/use file includes the attributes information providing address correlated with the contents data identification information, and the information processing apparatus executes the program when contents data are already registered in a database or the reception of the contents data corresponding to the contents providing address in the acquisition request file transmitted from an external apparatus is completed before externally and temporarily storing an acquisition/use file including the contents providing address corresponding to the acquisition request for contents data to an external apparatus and an attributes information providing address, separate from the contents providing address, and after requesting the contents data corresponding to the contents providing address.

24. The computer-readable medium according to claim 23, wherein the controlling reproduction of the contents data comprises:

restricting reproduction of the contents data to a number of times a user is authorized to reproduce the contents data.

25. A contents acquisition method comprising:

transmitting file request information that requests an acquisition/use file including a contents providing address corresponding to a request for acquiring contents data stored in an external apparatus and an attributes information providing address, separate from the contents providing address;

receiving the acquisition/use file corresponding to the file request information;

temporarily storing the acquisition/use file received;

determining whether contents identification information corresponding to the contents providing address in the acquisition/use file is registered in a database;

transmitting contents request information for requesting the contents data corresponding to the contents identification information to the external apparatus when it is determined that the contents identification information is not registered in the database;

receiving the contents data transmitted from the external apparatus as a result of transmitting the contents request information to the external apparatus;

temporarily storing the contents identification information as in-storage contents identification information when it is determined that the contents identification information is registered in the database and temporarily storing the contents identification information as in-storage contents identification information when the reception of the contents data is completed;

transmitting attributes request information for requesting contents attributes information for altering the attributes of the contents data corresponding to the in-storage contents identification information to the attributes information providing address in the acquisition/use file when the temporarily storing of the in-storage contents identification information is completed;

receiving the contents attributes information corresponding to the attributes request information;

temporarily storing the contents attributes identification information corresponding to the contents attributes information after the completion of the reception of the contents attributes information in the receiving the contents attributes information;

registering the contents data and the contents attributes information in the database; and deleting the temporarily stored information after the registration of the contents data and the contents attributes information in the database.

* * * * *